(12) United States Patent
Gamburg et al.

(10) Patent No.: US 11,849,739 B1
(45) Date of Patent: Dec. 26, 2023

(54) COLLAPSIBLE, DEFORMABLE CONTAINER AND DISPENSING APPARATUS

(71) Applicant: Container Innovations LLC, Englishtown, NJ (US)

(72) Inventors: Roman Gamburg, Englishtown, NJ (US); Ilya Margolin, Longmeadow, MA (US)

(73) Assignee: Container Innovations LLC, Englishtown, NJ (US)

( * ) Notice: Subject to any disclaimer, the term of this patent is extended or adjusted under 35 U.S.C. 154(b) by 568 days.

(21) Appl. No.: 16/994,451

(22) Filed: Aug. 14, 2020

Related U.S. Application Data

(60) Provisional application No. 62/887,129, filed on Aug. 15, 2019.

(51) Int. Cl.
  *A23G 9/50* (2006.01)
  *B65D 85/78* (2006.01)
  *A23G 9/28* (2006.01)

(52) U.S. Cl.
  CPC ............... *A23G 9/283* (2013.01); *A23G 9/50* (2013.01); *B65D 85/78* (2013.01)

(58) Field of Classification Search
  CPC .................................. A23G 9/50; B65D 85/78
  See application file for complete search history.

(56) References Cited

U.S. PATENT DOCUMENTS

| | | | |
|---|---|---|---|
| 2,880,902 A | 4/1959 | Owsen | |
| 2,899,110 A | 8/1959 | Parker | |
| 3,143,429 A | 8/1964 | Swanson et al. | |
| 3,220,544 A | 11/1965 | Lovell | |
| 3,471,058 A | 10/1969 | Latham et al. | |
| 4,773,458 A | 9/1988 | Touzani | |
| 4,873,100 A | 10/1989 | Dirksing et al. | |
| 5,215,222 A | 6/1993 | McGill | |

(Continued)

OTHER PUBLICATIONS

"One Shot Ice Cream Containers." The One Shot Corporation. <http://www.one-shot.com/ice-cream-dispensing/ice-cream-containers.html>. 2013.

(Continued)

*Primary Examiner* — Jeremy Carroll
(74) *Attorney, Agent, or Firm* — The Law Office of Patrick F. O'Reilly III, LLC

(57) ABSTRACT

A collapsible, deformable container and dispensing apparatus is disclosed herein. The deformable container includes an end wall section; a first annular wall section connected to the end wall section; a curved wall section connected to the first annular wall section; and a second annular wall section connected to the first annular wall section via the curved wall section, the second annular wall circumscribing a central void. Upon extrusion of a dispensable product from the deformable container by a force exerted upon the end wall section, the curved wall section is configured to deform into the central void circumscribed by the second annular wall section, and the first annular wall section is configured to deform into and invert within the central void circumscribed by the second annular wall section. The dispensing apparatus includes a container removal component for removing the deformable container after a dispensable product has been extracted therefrom.

9 Claims, 24 Drawing Sheets

(56) References Cited

U.S. PATENT DOCUMENTS

| | | | |
|---|---|---|---|
| 5,224,613 A | 7/1993 | Robbins, III | |
| 5,232,027 A | 8/1993 | Tanaka | |
| 5,333,761 A | 8/1994 | Davis | |
| 5,417,337 A | 5/1995 | Robbins, III | |
| 5,439,128 A | 8/1995 | Fishman | |
| 5,584,413 A | 12/1996 | Jung | |
| D407,093 S | 3/1999 | Wells | |
| 5,893,485 A | 4/1999 | McGill | |
| 5,913,342 A | 6/1999 | McGill | |
| 5,918,767 A | 7/1999 | McGill | |
| 6,105,815 A | 8/2000 | Mazda | |
| 6,182,862 B1 | 2/2001 | McGill | |
| 6,319,532 B1 | 11/2001 | Pineault | |
| 6,712,236 B1 | 3/2004 | McGill | |
| 6,715,648 B2 | 3/2004 | Kim | |
| 6,866,163 B2 | 3/2005 | McGill | |
| 6,997,356 B2 | 2/2006 | McGill | |
| 7,017,783 B1 | 3/2006 | Hunter et al. | |
| 7,165,699 B2 | 1/2007 | McGill | |
| 7,278,555 B2 | 10/2007 | McGill | |
| 7,654,402 B2 | 2/2010 | Kusuma | |
| 8,529,974 B2 | 9/2013 | Ortiz et al. | |
| 9,370,198 B2 | 6/2016 | Gamburg et al. | |
| 2004/0238576 A1* | 12/2004 | McGill | A23G 9/285 |
| | | | 222/495 |
| 2007/0275131 A1* | 11/2007 | Bertini | A23G 9/00 |
| | | | 426/115 |
| 2008/0099476 A1 | 5/2008 | Fung | |
| 2009/0114657 A1 | 5/2009 | Hsu | |
| 2009/0202684 A1 | 8/2009 | Willemsen et al. | |
| 2011/0248040 A1 | 10/2011 | McGregor | |
| 2013/0026182 A1* | 1/2013 | Habibi-Naini | B05C 17/00553 |
| | | | 222/326 |
| 2014/0263439 A1* | 9/2014 | Wright | F17D 1/08 |
| | | | 222/93 |
| 2015/0060485 A1 | 3/2015 | Gamburg et al. | |
| 2015/0060486 A1* | 3/2015 | Gamburg | A23G 9/50 |
| | | | 222/107 |

OTHER PUBLICATIONS

"2014 Creative FAD CE LFGB standard silicon travel water milk coffee saucers cups, worked as ice cream pudding mold, free shipping." <http://www.aliexpress.com/item/2014-Creative-FAD-CELfFGB-standard-silicon-travel-water-milk-coffee cups-saucers-worked-as-ice/1813183549.html>. 2014.

International Search Report for PCT International Application No. PCT/US2014/053735, dated Dec. 23, 2014.

Office Action for U.S. Appl. No. 14/475,294, dated Oct. 28, 2015.

Office Action for U.S. Appl. No. 14/475,304, dated Nov. 3, 2015.

* cited by examiner

A-A

View C

View A

① ② ③

④ ⑤ ⑥

COLLAPSIBLE, DEFORMABLE CONTAINER AND DISPENSING APPARATUS

CROSS-REFERENCE TO RELATED APPLICATIONS

This patent application claims priority to, and incorporates by reference in its entirety, U.S. Provisional Patent Application No. 62/887,129, entitled "Collapsible, Deformable Container And Dispensing Apparatus", filed on Aug. 15, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The present invention relates to an apparatus for dispensing viscous or semi-solid product (e.g., ice cream) from prefilled containers, preferably single-serving deformable collapsible containers, and to the prefilled containers that are designed for use therewith so that the product they contain is dispensed by extrusion.

2. Background

Frequently, frozen desserts and other viscous or semi-solid food products, such as ice cream, are dispensed at the point of sale in pre-packed form by scoops out of large containers in a refrigerator, or in a flow from a freezing, mixing and dispensing machine.

Dispensing a viscous or semi-solid food product by scoop from a container has the advantage of inexpensive production and transport, but dispensing the food product is slow, especially when the proper hygienic precautions are taken. Scoop-dispensed viscous or semi-solid food products also allows the facility to provide a range of different food products (e.g., different flavors of ice cream) including those containing fruit, nuts and other solids. However, freezers for maintaining the containers of different viscous or semi-solid food products can be large and bulky, and large commercial food product containers are susceptible to contamination.

Machines for dispensing so called "soft" or "soft-serve" frozen dessert items are known, wherein liquid ingredients are loaded into a machine that mixes, freezes and dispenses the frozen dessert items, such as soft serve ice cream, into cones or other containers. Such machines have previously had high power requirements and are expensive to manufacture. Additionally, different mixing and dispensing equipment is required for each flavor, such that it is usual for such machines to have a capacity for only one, two or, perhaps, three flavors. Moreover, these machines are often difficult to maintain, and, due to the nature of the product which must be used, the quality of the frozen dessert item dispensed therefrom does not compare favorably with the possible quality of products dispensed by scoop.

Hygiene requirements for dispensing food products are becoming stricter. Moreover, convenience and variety of product are of greater importance. Pre-packed frozen food products are relatively expensive to produce and distribute but have the advantage that a wide range of flavors and types of food products can be sold at a single outlet, the only requirement being a refrigerator to keep the product frozen. Thus, dispensing a soft serve product from prefilled containers permits service of a large variety of flavors utilizing simple, inexpensive equipment with minimum level of labor and with conformity to the highest modern hygienic standards.

However, an important aspect of using prefilled containers is a filling process. Design of the container must provide a practical way for filling from small dispensers as well as use in high output production lines.

Various types of deformable containers are already known for single serving, pre-packaged frozen food products, but numerous problems exist with these containers, such as they waste a portion of the food product by leaving remnants of the food product inside the container after being collapsed, and they are not environmentally friendly, as they require significant space for transportation and waste management. As an example of other problems with these containers, many conventional containers do not contemplate and overcome any spring-back action that may prevent the container, once formed, from maintaining its flattened shape.

Today, the new technology of producing frozen desserts allows the product to be kept at the temperature of a home refrigerator and accordingly can be used at home. Many conventional dispensers are made for commercial use and would be difficult to place in a household kitchen space due to their relatively large size compared to an average household kitchen, and are made for extruding product from their own containers, and thus are not easily adaptable to other types of containers. This causes a necessity for a small, simply operated dispenser for household and commercial locations where space is limited and a business owner would like to add additional product to its menu without many expenses.

Therefore, what is needed is a deformable container that collapses into a substantially flattened shape after the dispensing of a viscous or semi-solid food product contained within, thus leaving nearly no remnants inside the container. Moreover, a deformable container is needed that is designed to prevent spring-back action that may prevent the container, once formed, from maintaining its flattened shape. Furthermore, there is a need for a dispensing apparatus for dispensing a viscous or semi-solid product from a prefilled single-serving deformable container that is hygienic and adaptable to different applications. In addition, a dispensing apparatus is needed that has the ability to remove empty containers from their seating after the food product has been dispensed therefrom.

BRIEF SUMMARY OF EMBODIMENTS OF THE INVENTION

Accordingly, the present invention is directed to a collapsible, deformable container and dispensing apparatus that substantially obviates one or more problems resulting from the limitations and deficiencies of the related art.

In accordance with one or more embodiments of the present invention, there is provided a deformable container that includes an end wall section; a first annular wall section connected to the end wall section; a curved wall section connected to the first annular wall section; and a second annular wall section connected to the first annular wall section via the curved wall section, the second annular wall circumscribing a central void. In these one or more embodiments, upon extrusion of a dispensable product from the deformable container by a force exerted upon the end wall section, the curved wall section is configured to deform into the central void circumscribed by the second annular wall section, and the first annular wall section is configured to deform into and invert within the central void circumscribed by the second annular wall section.

In a further embodiment of the present invention, the first annular wall section and the second annular wall section each comprise straight wall portions, the first annular wall section having a first diameter and the second annular wall section having a second diameter, the second diameter of the second annular wall section being greater than the first diameter of the first annular wall section such that the deformable container has a stepped configuration.

In yet a further embodiment, the first annular wall section has a first wall thickness, the second annular wall section has a second wall thickness, and the curved wall section has a third wall thickness. In this further embodiment, the first wall thickness of the first annular wall section is less than the second wall thickness of the second annular wall section, and the third wall thickness of the curved wall section is less than the first wall thickness of the first annular wall section.

In still a further embodiment, the first annular wall section has a first wall thickness, the second annular wall section has a second wall thickness, and the curved wall section has a third wall thickness. In this further embodiment, the first wall thickness of the first annular wall section is approximately equal to the second wall thickness of the second annular wall section, and the third wall thickness of the curved wall section is less than the first and second wall thicknesses.

In yet a further embodiment, the deformable container further comprises a lid, the lid including a lid straight wall portion that corresponds to the straight wall portion of the second annular wall section, the lid straight wall portion configured to be disposed adjacent to the straight wall portion of the second annular wall section when the lid is inserted into an open end of the second annular wall section, and the lid straight wall portion supporting the straight wall portion of the second annular wall section when the force is being exerted upon the end wall section of the first annular wall section so as to prevent a buckling of the straight wall portion of the second annular wall section.

In still a further embodiment, the lid further comprises a first ledge portion and the second annular wall section comprises a second ledge portion, the first ledge portion of the lid configured to engage with the second ledge portion of the second annular wall section when the lid is inserted into the open end of the second annular wall section so that the lid locks into place with the second annular wall section.

In yet a further embodiment, the deformable container further comprises a lid, the lid including a lid end wall section defining an orifice for dispensing of the dispensable product from the deformable container.

In still a further embodiment, the orifice in the lid end wall section has a crisscross shape that allows for variable orifice sizes depending on a viscosity and/or hardness of the dispensable product being extruded from the deformable container.

In accordance with one or more other embodiments of the present invention, there is provided a dispensing apparatus for extraction of dispensable products from deformable containers. The dispensing apparatus includes a frame component configured to support a deformable container; a container removal component configured to rotate about one or more hinges, the container removal component configured to remove the deformable container from a dispensing area of the dispensing apparatus after a dispensable product has been extracted from the deformable container; a disposal compartment for holding the empty deformable container after the dispensable product has been extracted from the deformable container; and an actuator operatively coupled to the container removal component, the actuator configured to displace the container removal component to one or more predetermined angles whereby the empty deformable container is configured to slide into the disposal compartment.

In a further embodiment of the present invention, the disposal compartment is configured such that empty deformable containers are capable of being stacked in a pile within the disposal compartment after sliding into the disposal compartment.

In accordance with yet one or more other embodiments of the present invention, there is provided a dispensing apparatus for extraction of dispensable products from deformable containers. The dispensing apparatus includes a frame component configured to support a deformable container with a stepped configuration, the deformable container including a first annular wall section, a second annular wall section, and a curved wall section, the second annular wall section being connected to the first annular wall section by the curved wall section, and the first annular wall section stepped inwardly relative to the second annular wall section by the curved wall section so as to form the stepped configuration of the deformable container; a container removal component configured to remove the deformable container from a dispensing area of the dispensing apparatus after a dispensable product has been extracted from the deformable container; a disposal compartment for holding the empty deformable container after the dispensable product has been extracted from the deformable container; and an actuator operatively coupled to the container removal component, the actuator configured to displace the container removal component to a disposal position so that the deformable container is able to be discharged into the disposal compartment.

In a further embodiment of the present invention, the dispensing apparatus further comprises a container fixture disposed on the frame component, the container fixture configured to engage with the stepped configuration of the deformable container.

In yet a further embodiment, the actuator is configured to rotate the container removal component about one or more hinges to the disposal position so that the deformable container is able to be discharged into the disposal compartment.

In still a further embodiment, the dispensing apparatus further comprises another actuator operatively coupled to a plunger, the plunger configured to exert a force on an end wall section of the deformable container so as to extrude the dispensable product from the deformable container.

In yet a further embodiment, the disposal compartment is configured such that empty deformable containers are capable of being stacked in a pile within the disposal compartment after sliding into the disposal compartment.

In still a further embodiment, the actuator is operatively coupled to a plunger, the plunger configured to exert a force on an end wall section of the deformable container so as to extrude the dispensable product from the deformable container.

In yet a further embodiment, the plunger forms the container removal component of the dispensing apparatus; and, after the dispensable product has been extracted from the deformable container, the plunger with the deformable container seated thereon is configured to be displaced to the disposal position so that the deformable container is able to be discharged into the disposal compartment.

In still a further embodiment, the dispensing apparatus further comprises a stripping component, the stripping component configured to separate the deformable container from the plunger so that the deformable container is able to be discharged into the disposal compartment.

In yet a further embodiment, the dispensing apparatus further comprises an inclined component, the inclined component configured to guide the deformable container into the disposal compartment after the deformable container is separated from the plunger, and the deformable container configured to invert as the deformable container enters the disposal compartment so that an extraction orifice of the deformable container is pointing upward in the disposal compartment.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The subject matter regarded as the invention is particularly pointed out and distinctly claimed in the concluding portion of this specification. The invention, however, both as to organization and method of operation, together with objects, features, and advantages thereof, may best be understood by reference to the following detailed descriptions when read with the accompanying drawings in which:

1) In position before placing container on fixture of the dispensing apparatus;
2) In position ready for extrusion of product when two step container placed on fixture of the dispensing apparatus;
3) At the end of dispensing operation performed by the dispensing apparatus with plunger fully collapsing deformable two step container;
4) In position when two step container is removed from fixture by the plunger, just before plunger reaches its upper position and container is removed from plunger by stripping element, like ring 57 of the dispensing apparatus;
5) In position when plunger reached its upper position, container is stripped from plunger and removed by inclined element 56 to extraction tunnel of the dispensing apparatus; and
6) In position when container capsizes in tunnel 20 of the dispensing apparatus.

Figure 9:
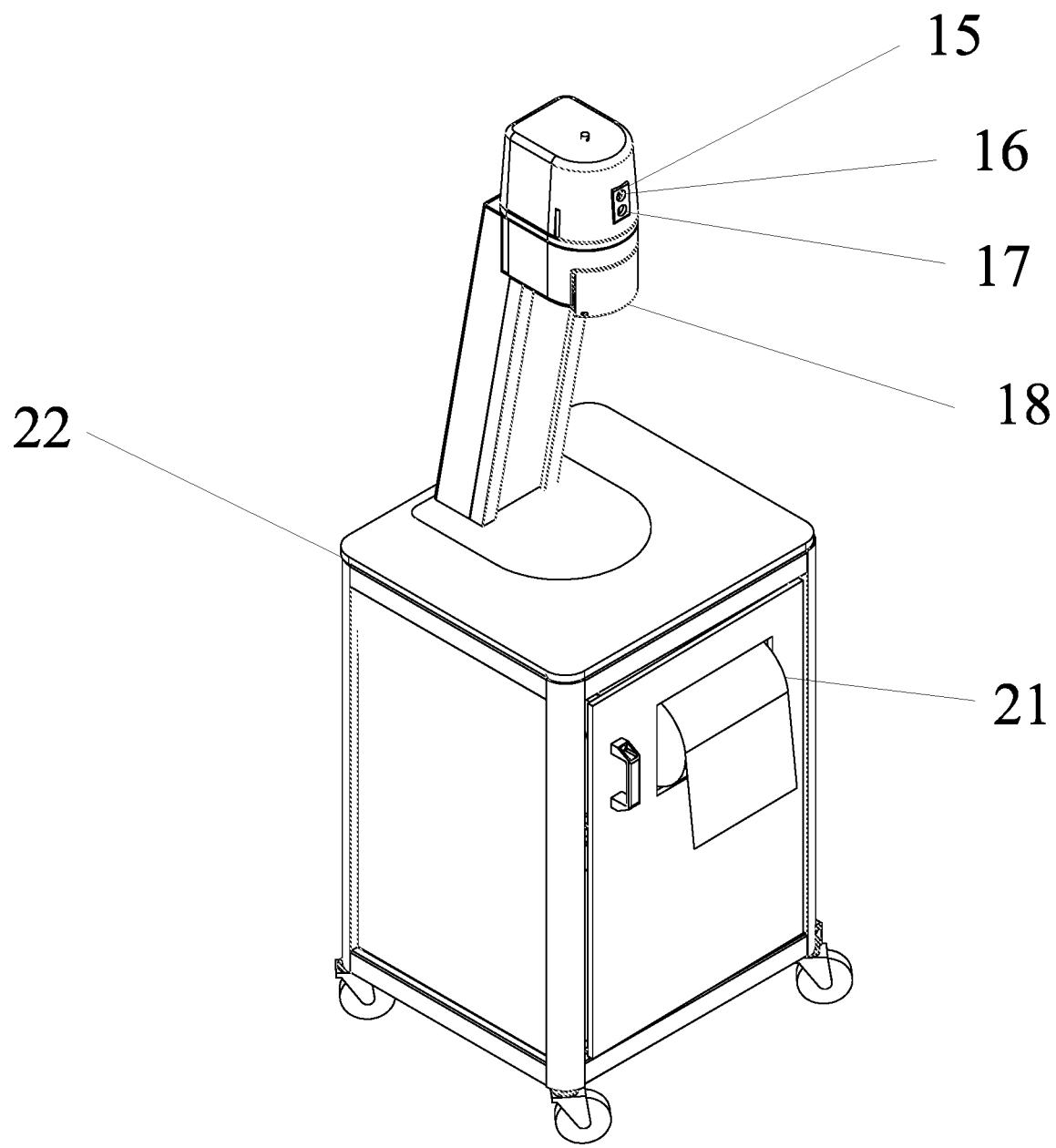
Figure 10:
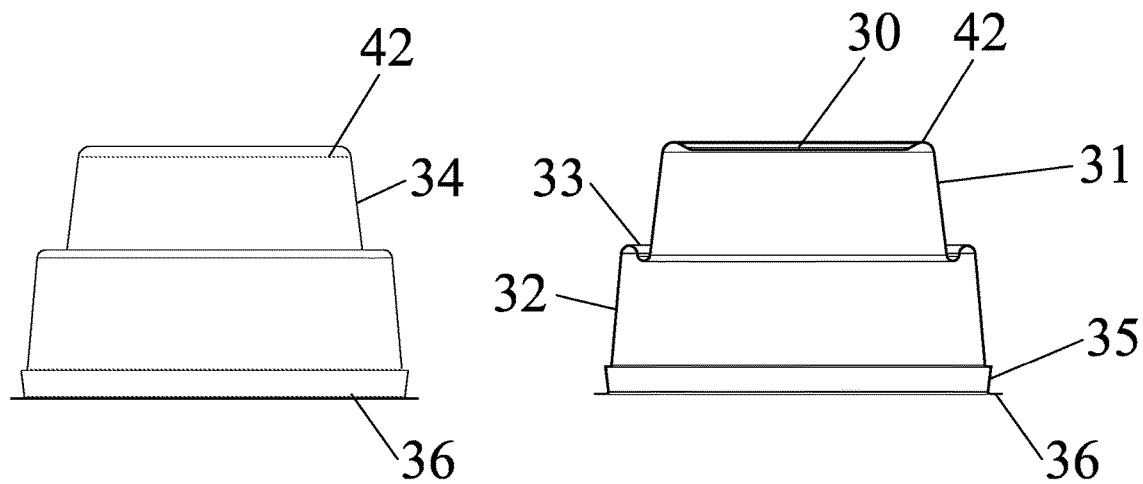
Figure 11:
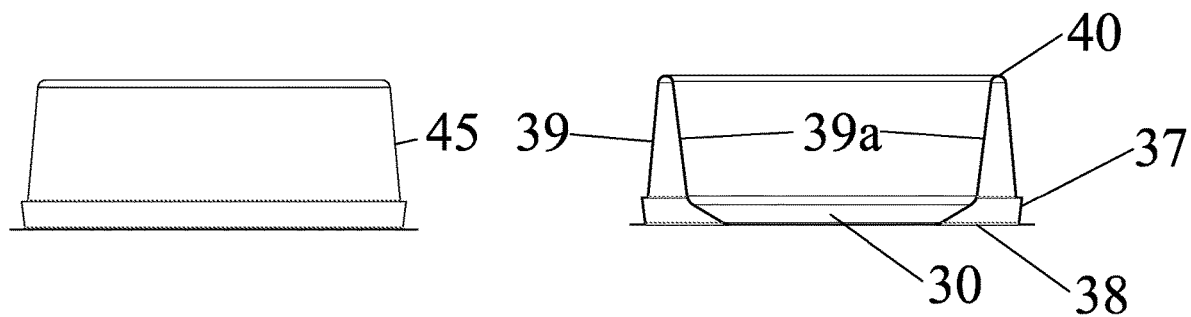
Figure 12A:
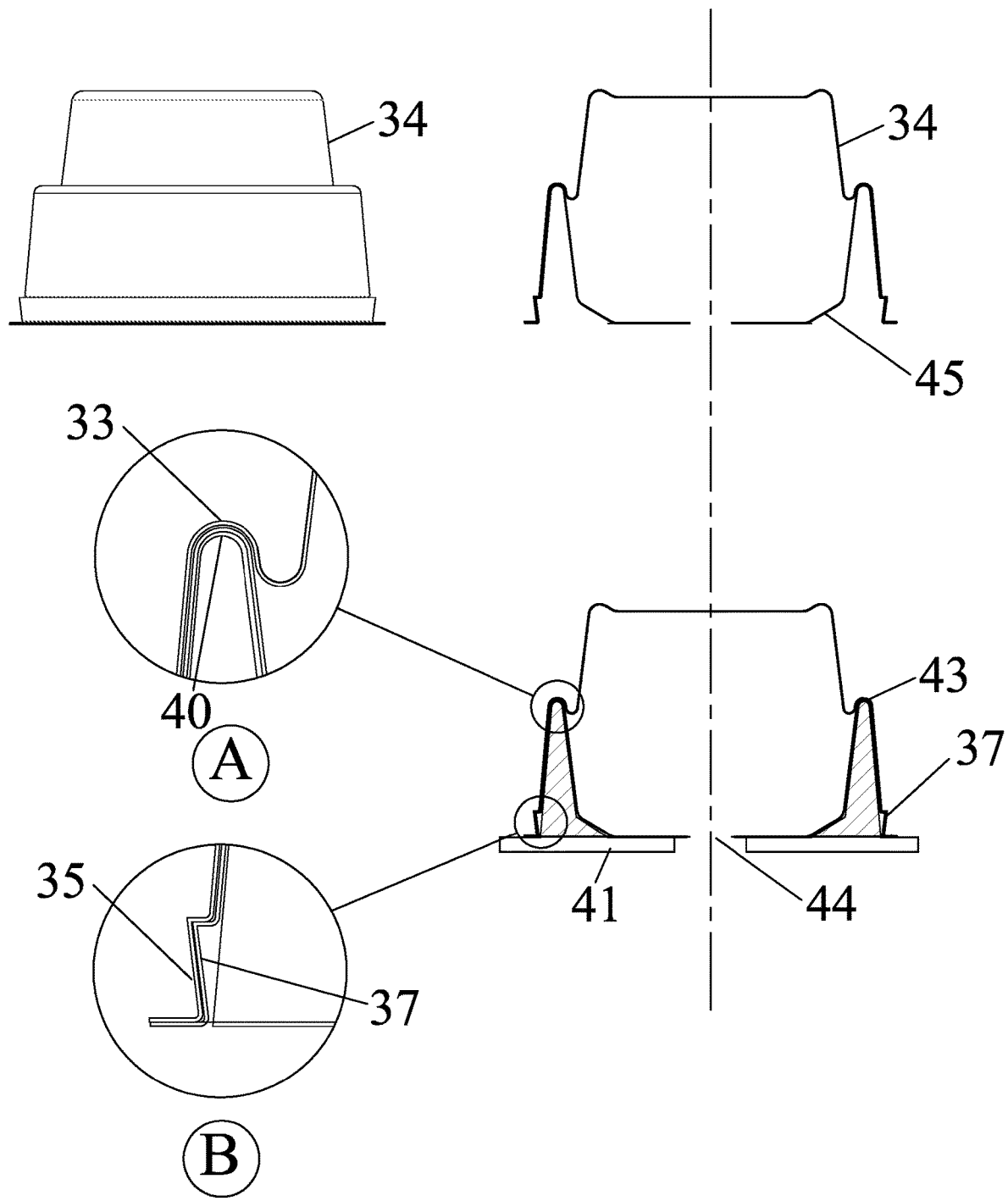
Figure 12B:
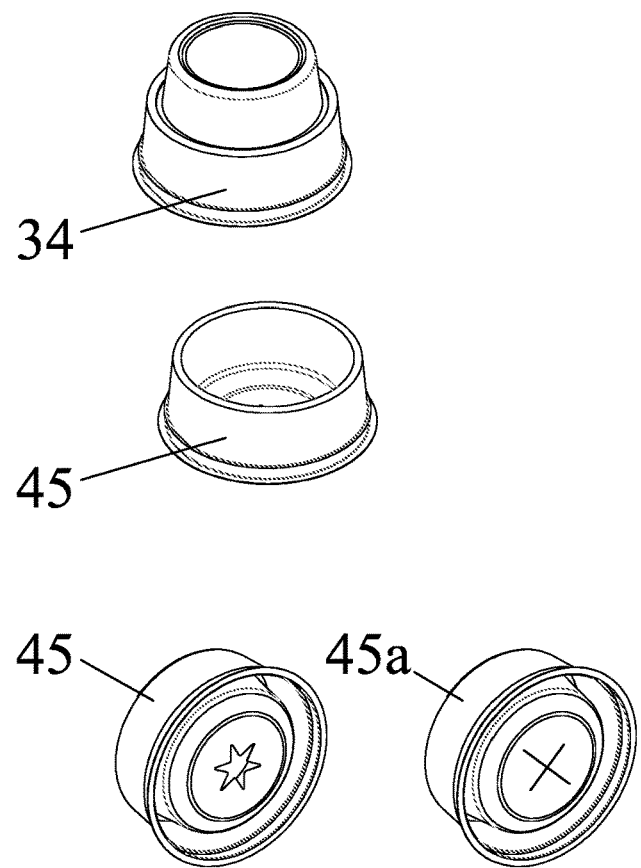
Figure 12C:
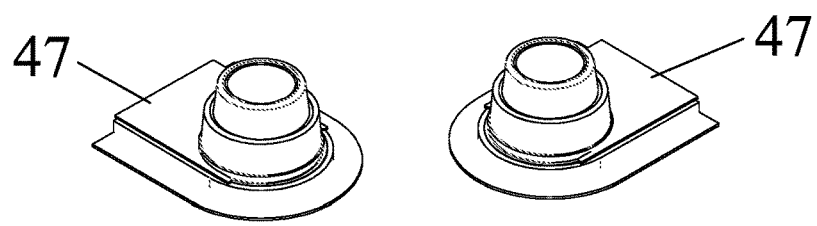
Figure 13:
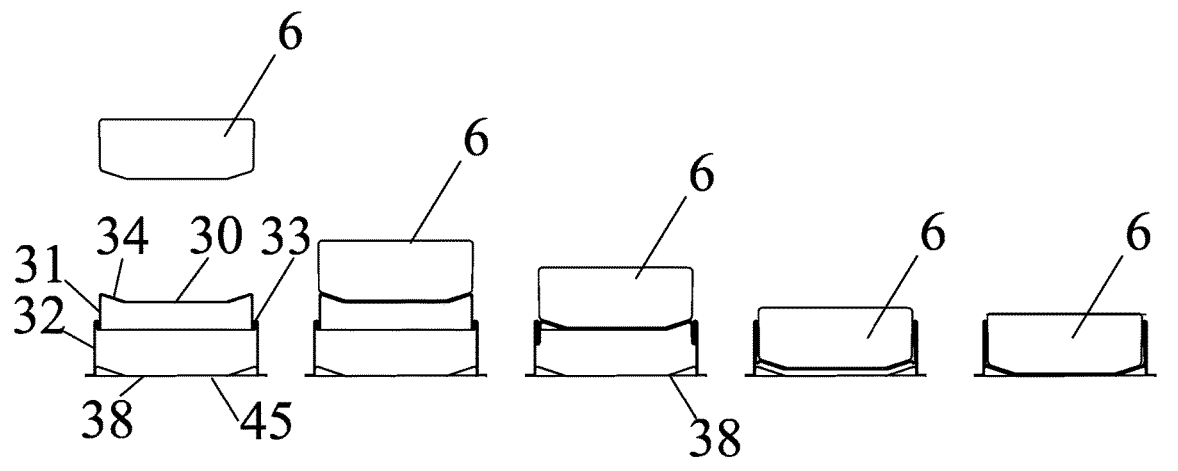
Figure 13:
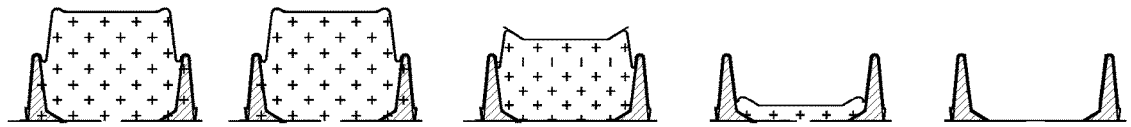

FIG. 9 is a view of a dispensing apparatus disposed on a cart, according to one embodiment of the invention;

FIG. 10 shows a side elevation and cross-sectional view of a collapsible two step container 34, according to one embodiment of the invention;

FIG. 11 shows a side elevation and cross-section view of the lid 45 for the collapsible two step container of FIG. 10;

FIG. 12a shows a side elevation and cross-sectional view of a collapsible two step container having a lid with thick solid walls;

FIG. 12b shows views of a cup and lids of a collapsible two step container, according to embodiments of the invention;

FIG. 12c shows special edge 47 inside frame of dispensing apparatus to give additional retention on container, according to one embodiment of the invention; and FIG. 13 shows the plunger of dispensing apparatus moving from uppermost to lowermost position with two step container collapsing under plunger pressure, according to one embodiment of the invention.

It will be appreciated that for simplicity and clarity of illustration, elements shown in the figures have not necessarily been drawn to scale. For example, the dimensions of some of the elements may be exaggerated relative to other elements for clarity purposes.

Throughout the figures, the same parts are always denoted using the same reference characters so that, as a general rule, they will only be described once.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as to not obscure the present invention. Reference is now made to the drawings, which show in greater detail several views of dispensing apparatus and deformable container according to aspects of the present invention.

In certain embodiments, the dispensing apparatus is configured for dispensing a single serving of a viscous or semi-solid food product from a collapsible, deformable container. The prefilled food product in the container may be extruded by a plunger which is driven by a linear actuator that causes the food product from the container to be discharged, and container is at least partially collapsed at the completion of discharging process. The plunger movement within predetermined limits may be monitored by a controller for detecting resistance. Empty containers after discharge may be automatically removed through the extraction tunnel, or removed by hand at some embodiments.

Referring to the embodiments depicted in FIGS. 1a-9, a dispensing apparatus for dispensing frozen dessert is shown, from collapsible container 4 which may be of the kind shown and described in U.S. Pat. No. 9,370,198 issued to Container Innovations LLC, which is incorporated by reference herein in its entirety. This dispensing apparatus is also suitable for a collapsible two step container 34 with a solid thick wall lid 43 as shown in FIG. 12a. Such containers comprise deformable fully collapsible to flat shape cup and cover with orifice (not shown) for dispensing product through which the product is to be discharged from container. Normally the product discharged from container is received in a cone 19 or other customer dish, beneath the outlet opening of the container 4, 34 that is achieved by plunger 6, having a head portion 5 with suitable bottom shape of container which, on movement of the plunger 6, in a product discharge movement, engages the deformable container 4 and fully collapses it to a flat shape on frame seating 3 (see e.g., FIG. 4a). The plunger movement is reciprocal at down direction for extrusion product from container and returns back after finishing the process. In certain embodiments, dispensing apparatus has an electric drive motor with linear drive 13, however plunger 6 can be engaged by any other kind of power, such as hydraulic, or by hand.

Figure 1A:
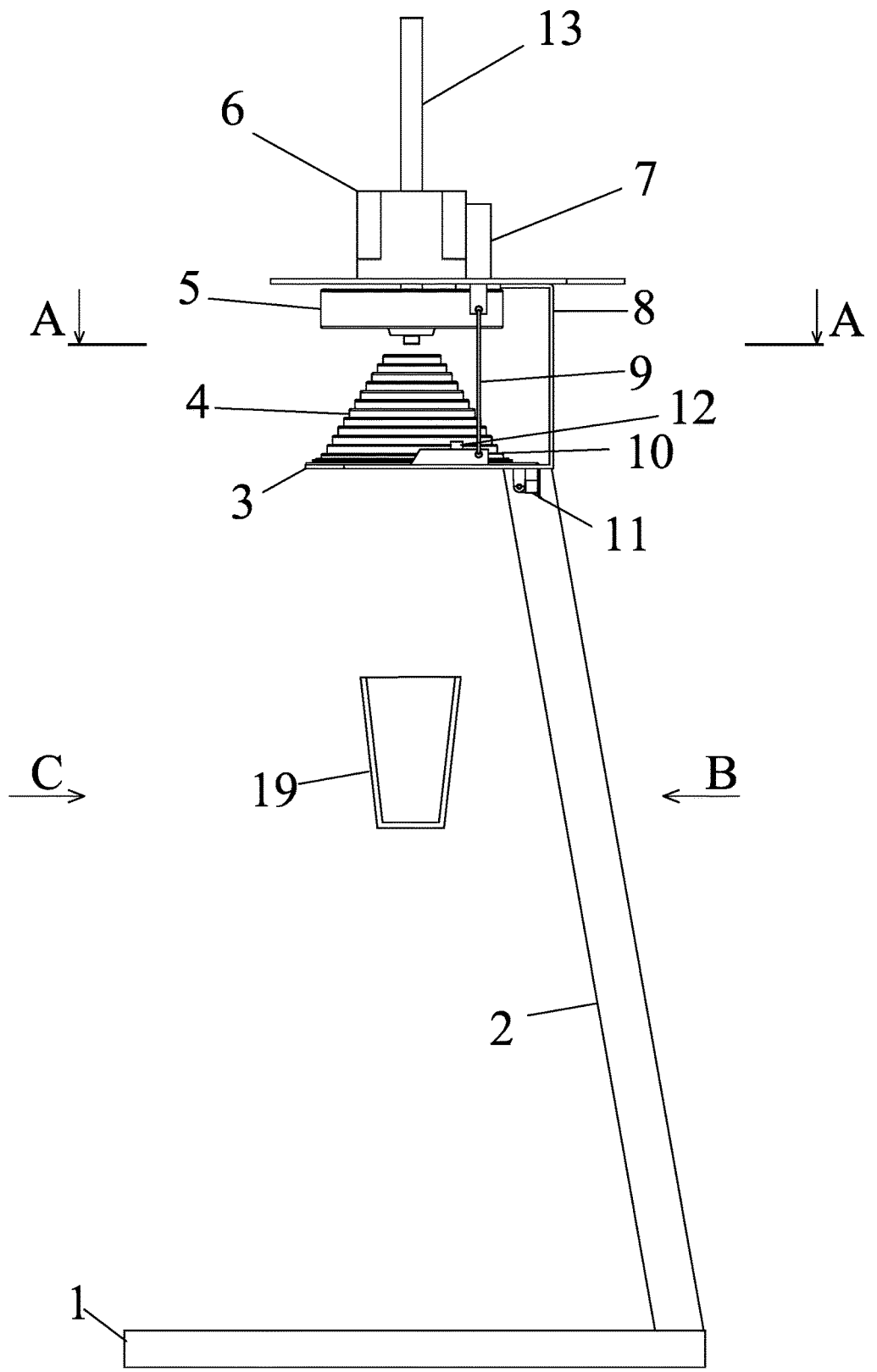
FIG. 1a shows a side elevation of a dispensing apparatus and deformable container, according to one embodiment of the invention.
Figure 1B:
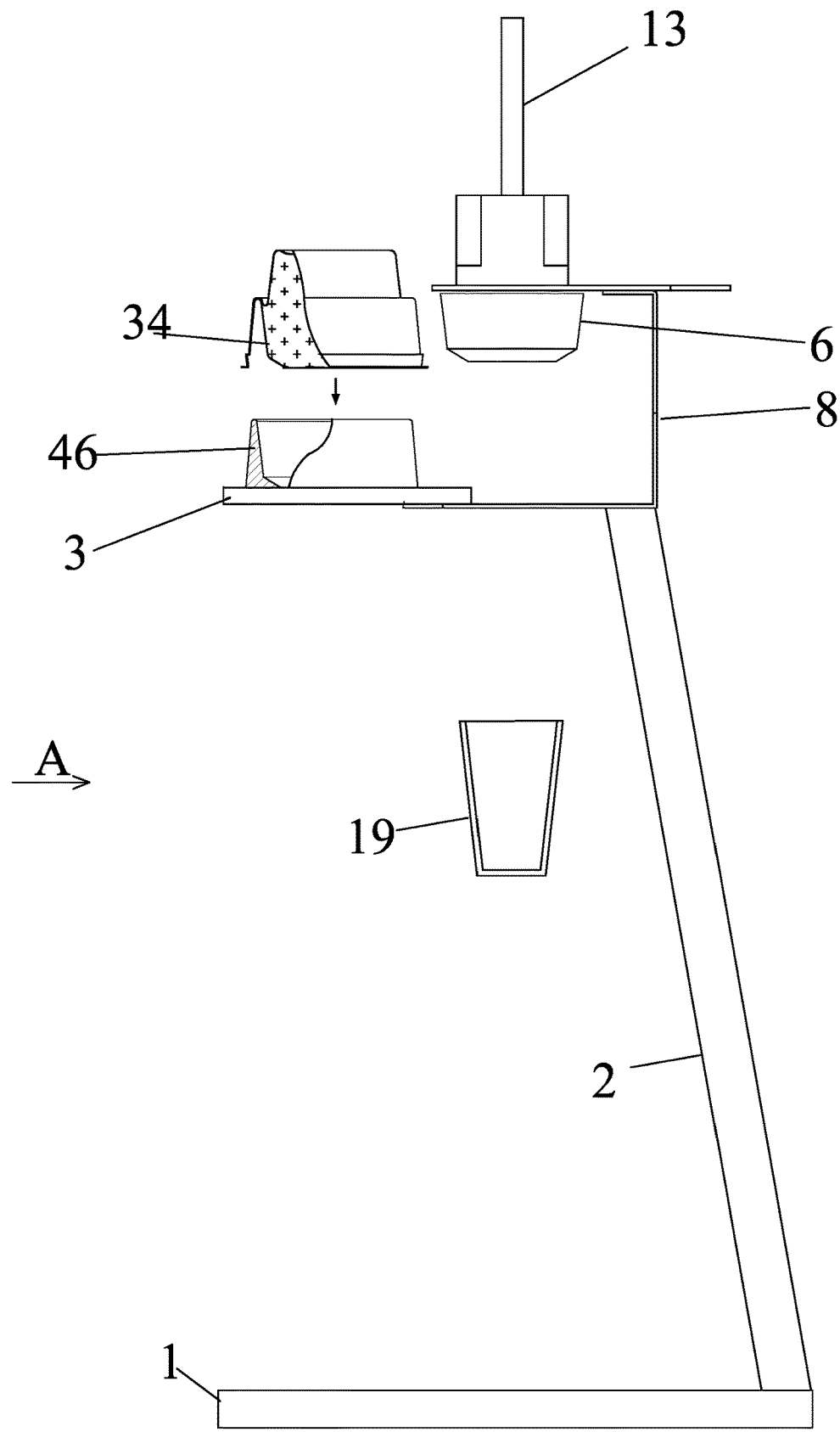
FIG. 1B shows a side elevation of a dispensing apparatus without automatic removal of empty container with fixed fixture for two step deformable container in position before placing container, according to another embodiment of the invention.
Figure 1C:
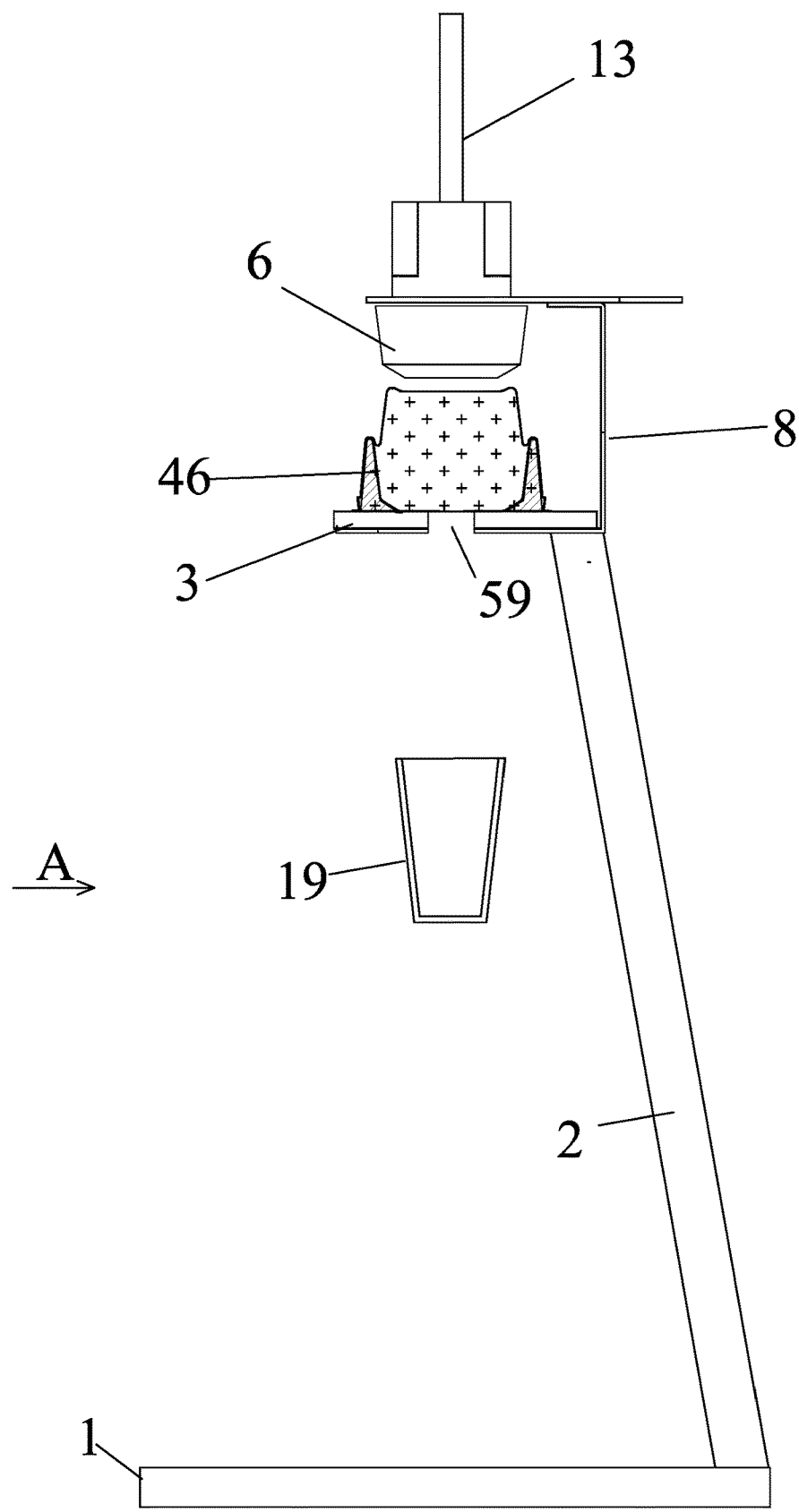
FIG. 1c shows a side elevation of a dispensing apparatus without automatic removal of empty container with two step deformable container placed on fixture in position ready for extrusion of product, according to the embodiment of FIG. 1B.

As shown in the embodiments of FIGS. 1a-9, dispensing apparatus comprises a rectangle shape frame with a short side open 8, in which upper part is seating for electric motor with control, and bottom part is seating for collapsible container and lifting mechanism for removal of empty container after extraction. Bottom part of seating frame 3 has opening (e.g., opening 59 in FIGS. 1c and 4b) for product extraction. In the embodiment of FIG. 1a, seating for collapsible container does not have cup-like shape support member for container and is made at flat shape 3, with two supporting pins 12 for keeping container at fixed position. Pins 12 go through holes made at plate 10 for removal of empty containers. This flat shape for seating collapsible container prevents putting the next prefilled container on the previous already discharged container, a process that frequently happens on dispensing apparatus with or without automatic removal option, with seating made in a cup-like shape supporting member.

Figure 7A:
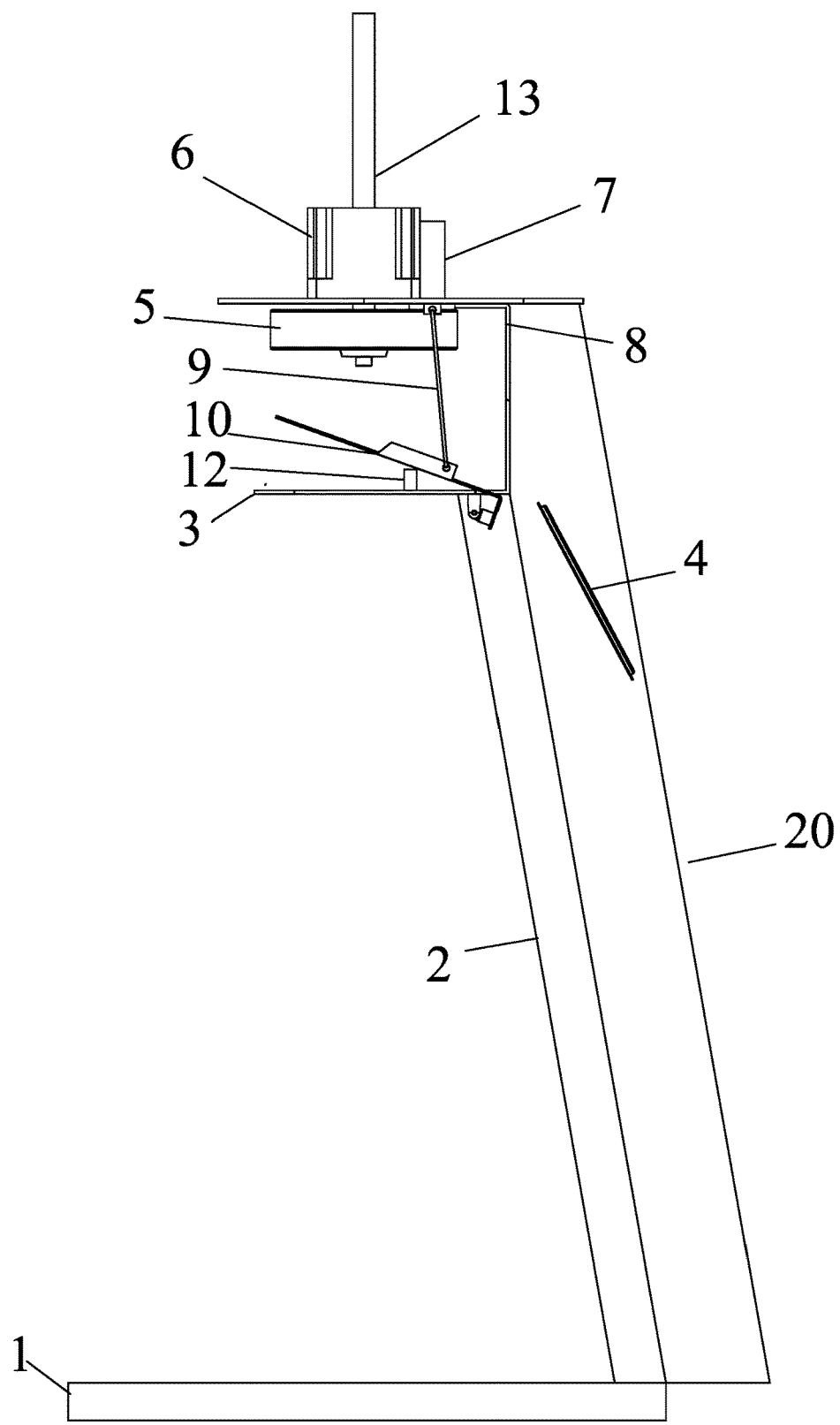
FIG. 7a is a side elevation of a dispensing apparatus showing empty collapsible container falling through extraction tunnel under gravity forces, according to still another embodiment of the invention.

In certain embodiments, the rectangular shape frame with short side open 8 is supported by disposal tunnel 20, supporting elements 2, and base 1 (see e.g., FIG. 7a). In certain embodiments, with reference to FIG. 9, there are two visible lights on control panel 15, on the front of dispensing apparatus for engaging dispenser (i.e., a green light 16 and red light 17). When green light is on, pushing green button will engage dispenser for extraction process. When something malfunctions, the red button will light up. For example, plunger cannot collapse container because product in cup is of too hard consistency, interrupting its movement, causing it to go back, or plunger getting stuck at middle of movement for any other reason. In this case, pushing red button 17 will return plunger to upper position and allow operator to remove undischarged container.

In order to avoid damaging the apparatus, the predetermined limit of power applied by motor on plunger is programmed to interrupt operation of the drive and arrange to reverse plunger to its initial position that will enable the apparatus to avoid any attempt to dispense product which is of too hard consistency. During time of dispensing and automatic removal of empty container, the green light 16 will blink to show that dispenser is working. When operation is finished and dispenser is ready for next container, the green light 16 will light up again. In certain embodiments, the dispensing apparatus operates as follows:

1) The container 4 with prefilled product is placed onto frame seating 3 where two supporting pins 12 keep it at predetermined fixed position.
2) The opening made at the plastic cover of dispenser for entering containers is closed with door 18 (see FIG. 9) that may be latched by a magnet, motorized or solenoid lock, or by any other switch (not shown).
3) The dispensing apparatus detects that there is container 4 in dispensing position, and opening is closed with the door 18 and latched (not shown). Then, the dispense indicator 16 will light up green to indicate that the machine is ready for dispensing and dispensing button 16 may be pressed.

Figure 4A:
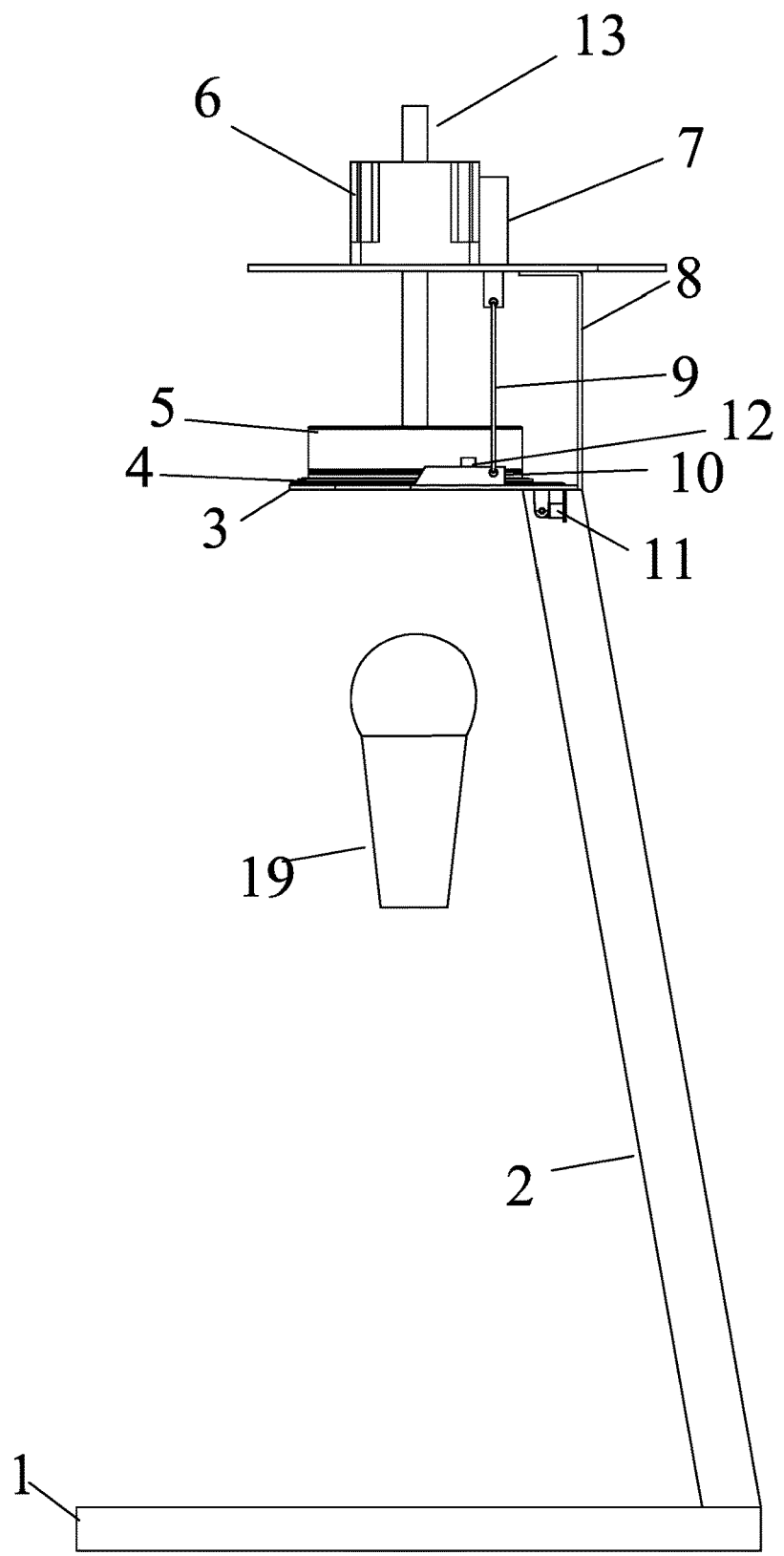
FIG. 4a is a side elevation showing the dispensing apparatus of the FIG. 1a embodiment at the end of dispensing operation with plunger fully collapsing deformable container with automatic removal.

4) After the dispensing button 16 is pressed, the linear actuator 13 commences operation and the plunger 6 moves downwards and dispenses product from the container 4, pushing container to collapse to flat shape at the end of the process, as shown in FIG. 4a.

5) Once the product has been dispensed, the linear actuator 13 retracts the plunger 6. When the plunger 6 has returned fully to its uppermost position (FIG. 5a), the second actuator 7 through connecting link 9 rotates the removal plate 10 around hinges 11 to the angle at which flat collapsible container 4 clears over supporting pins 12 as in FIG. 6a and gravity is sufficient enough for container to slide down through disposal tunnel with plastic cover 20 as in FIG. 7a. For example, in one illustrative embodiment, the inclination angle of the removal plate 10 in FIG. 6a may be in the range between 45 degrees and 60 degrees, inclusive of all values in the range.

6) The dispensing apparatus detects that the process of dispensing and removal is finished and removal plate 10 is back into place, then the light indicator will light up to show that dispenser is ready for new cycle.

Figure 5A:
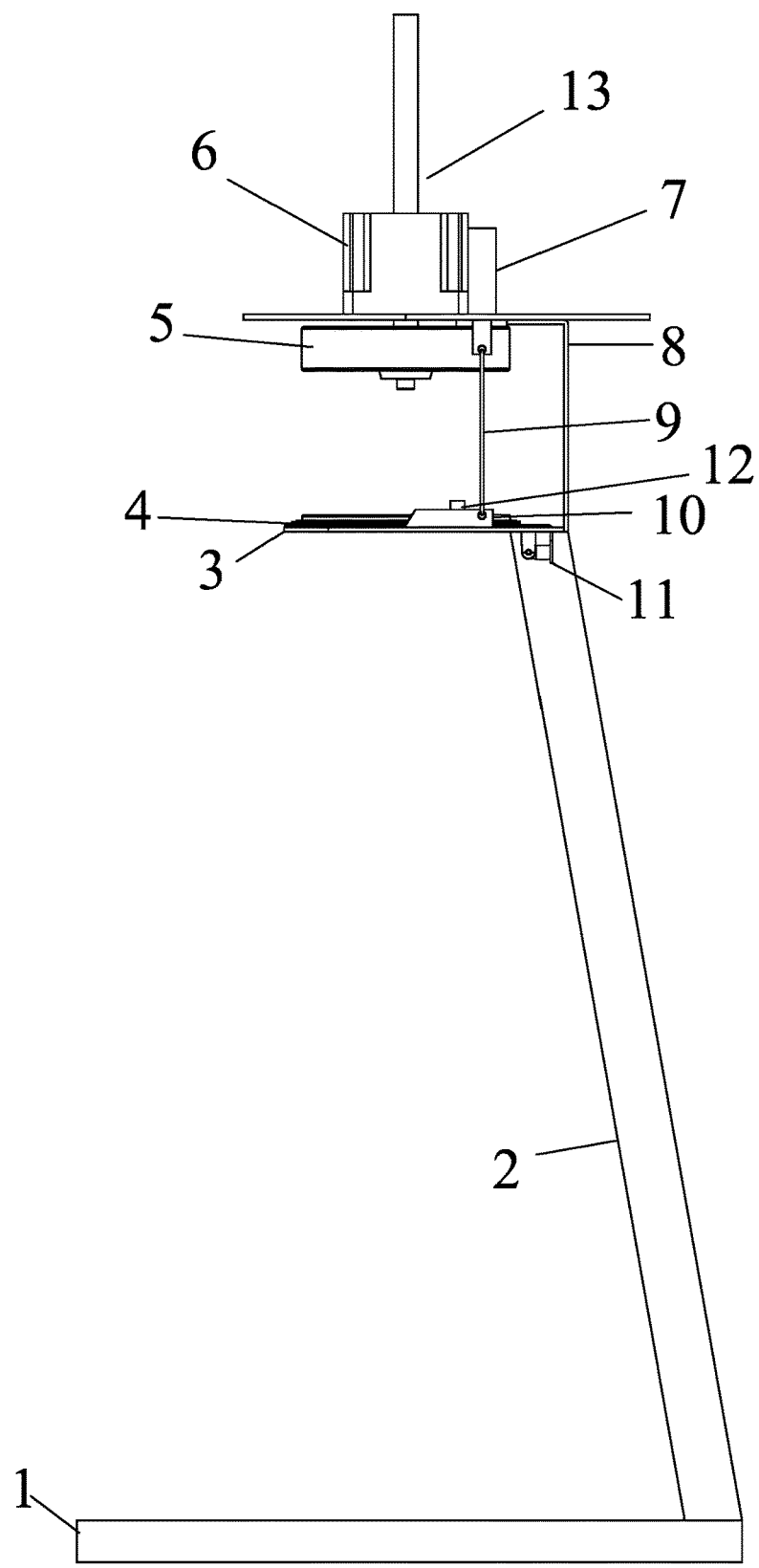
FIG. 5a is a side elevation showing the dispensing apparatus of the FIG. 1a embodiment with plunger returned to upper position after discharging product from deformable container and container at flat shape after collapsing during discharge process.
Figure 5B:
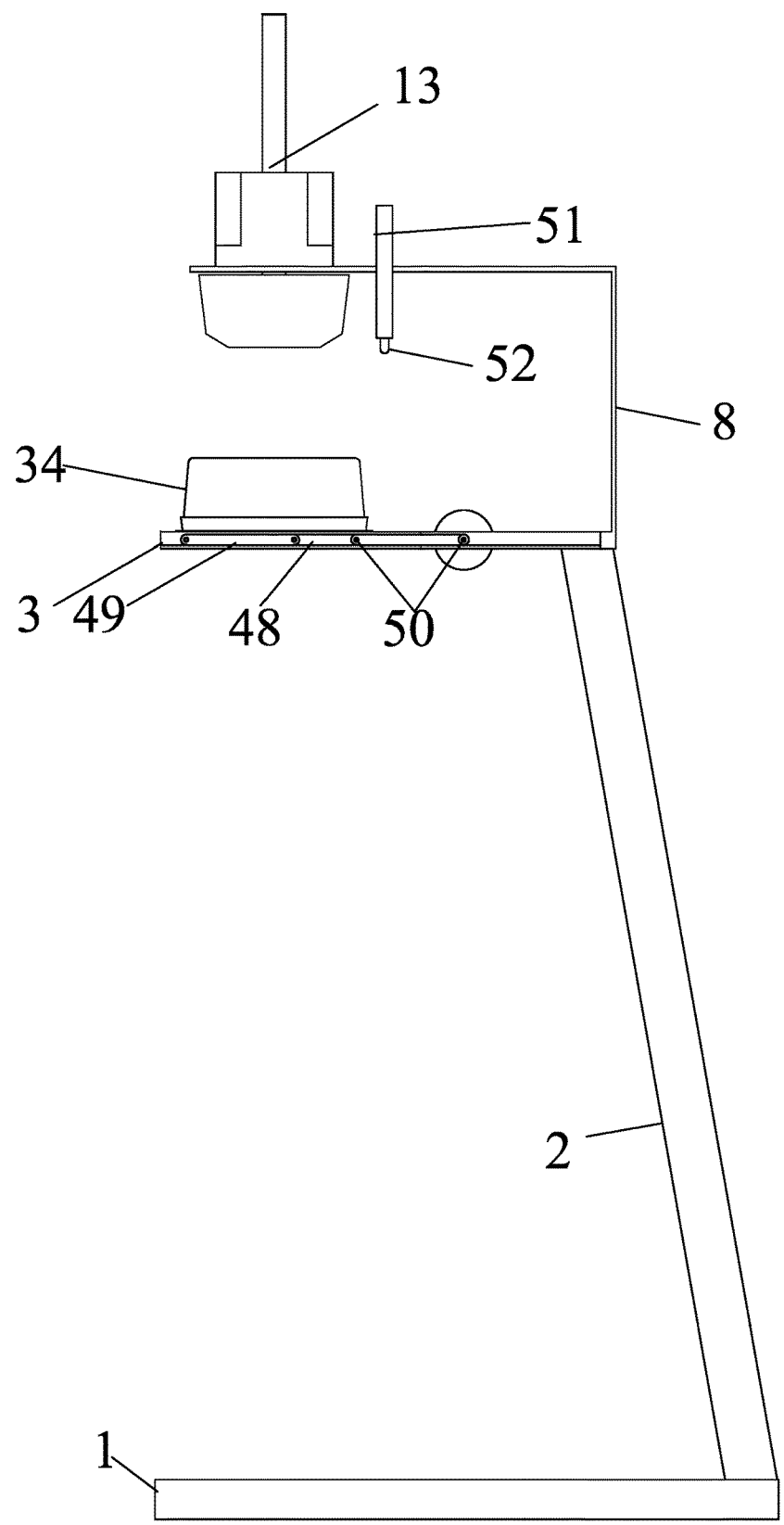
FIG. 5b is a side elevation showing a dispensing apparatus with plunger returned to upper position after discharging product from two step deformable container and collapsed container seating on fixture, according to yet another embodiment of the invention.
Figure 6A:
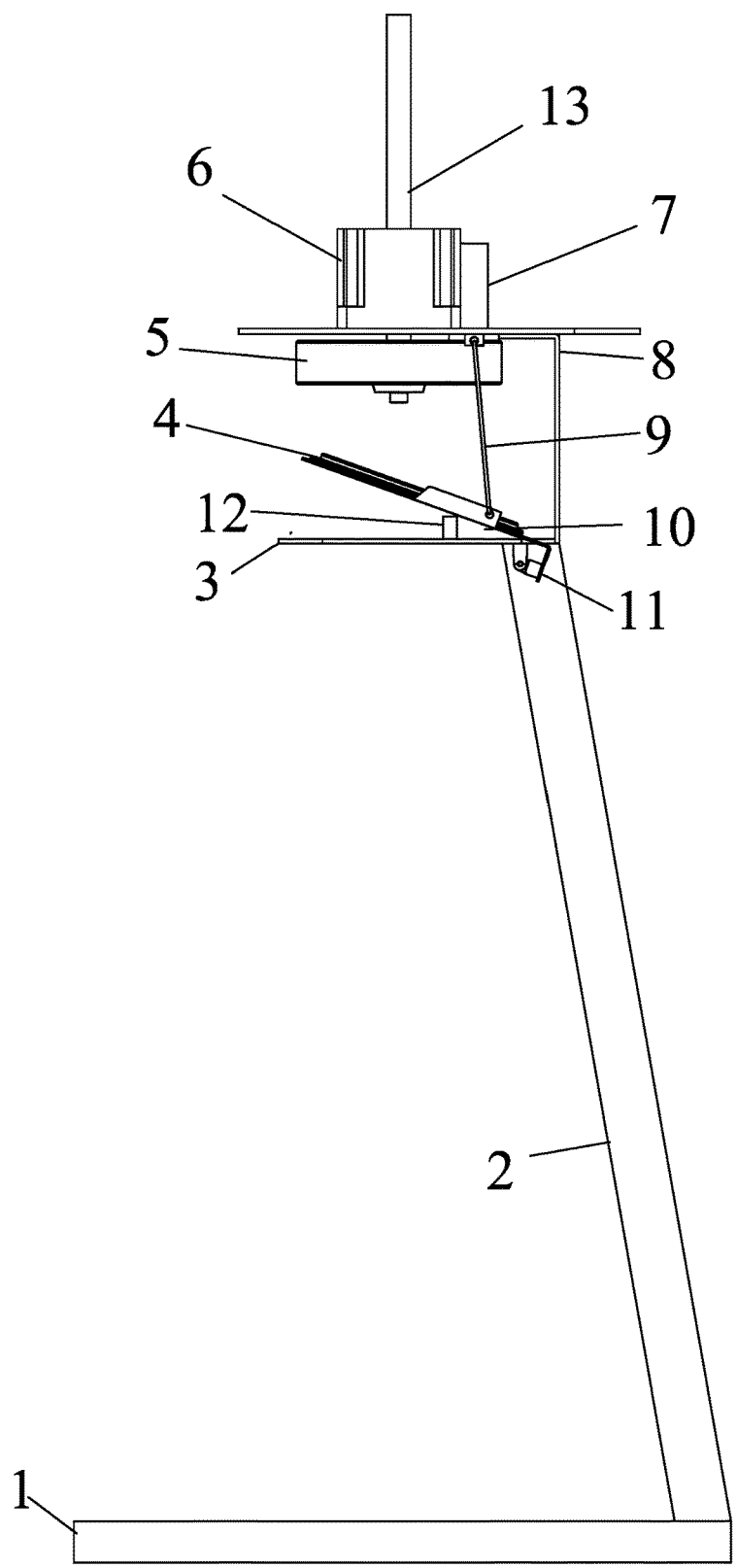
FIG. 6a is a side elevation of the FIG. 1a embodiment showing collapsible container moved to inclined position over supporting pins designated to keep container at fixed position during dispensing process.
Figure 6B:
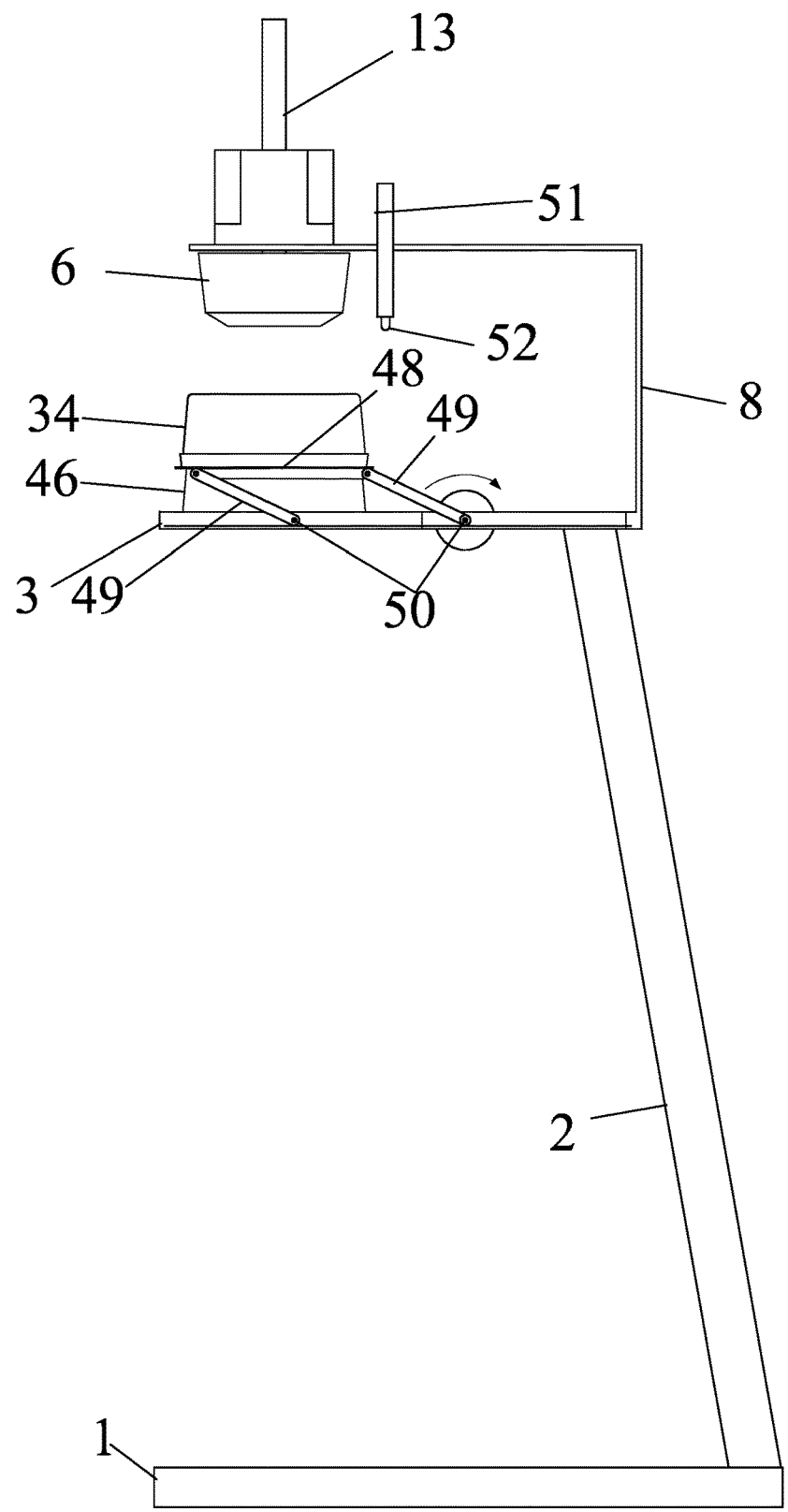
FIG. 6b is a side elevation of the dispensing apparatus of the FIG. 5b embodiment showing two step container during the beginning of its removal from fixture by removal mechanism.
Figure 6C:
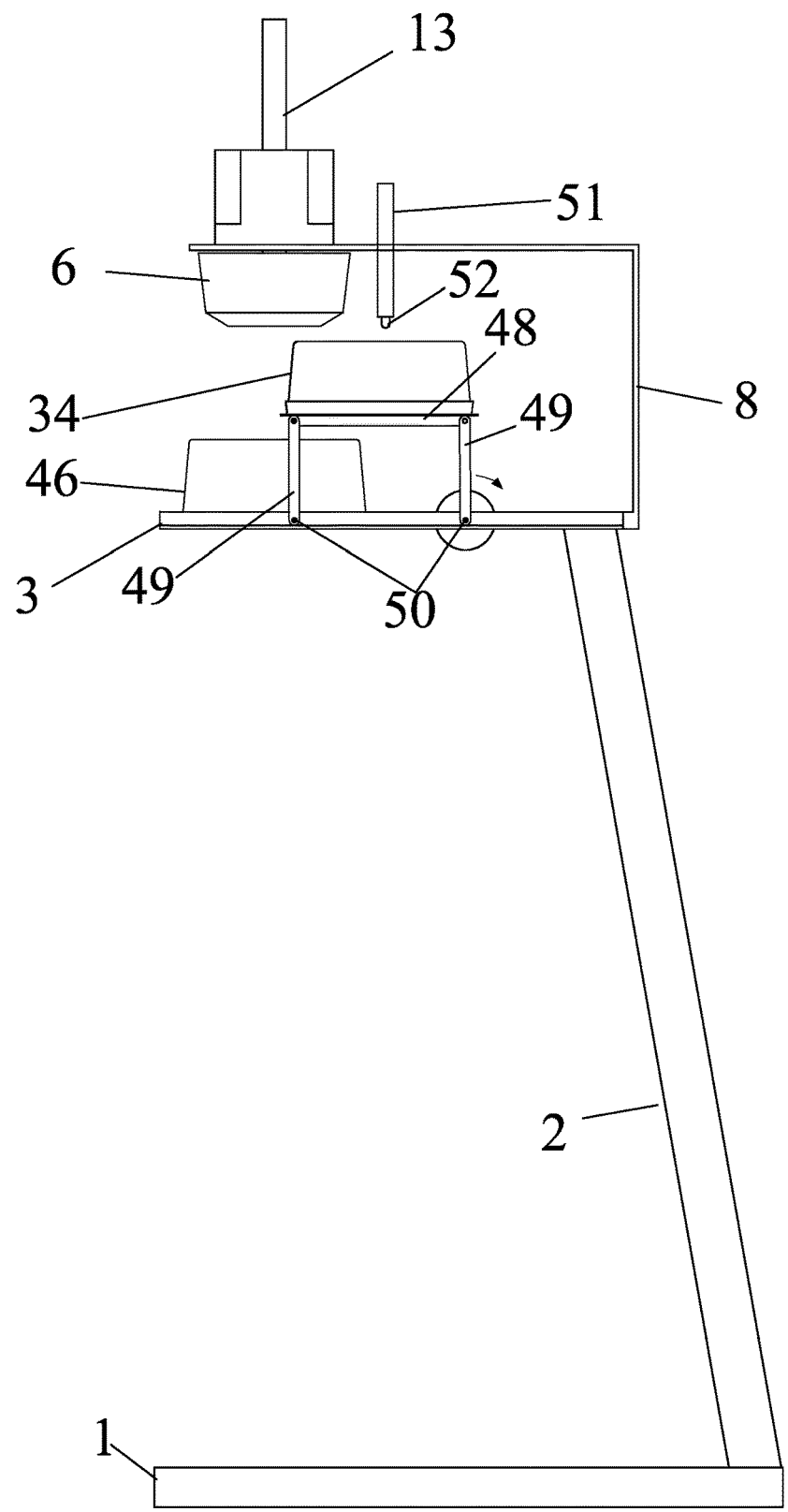
FIG. 6c is a side elevation of the dispensing apparatus of the FIG. 5b embodiment showing two step container after removal from fixture.
Figure 6D:
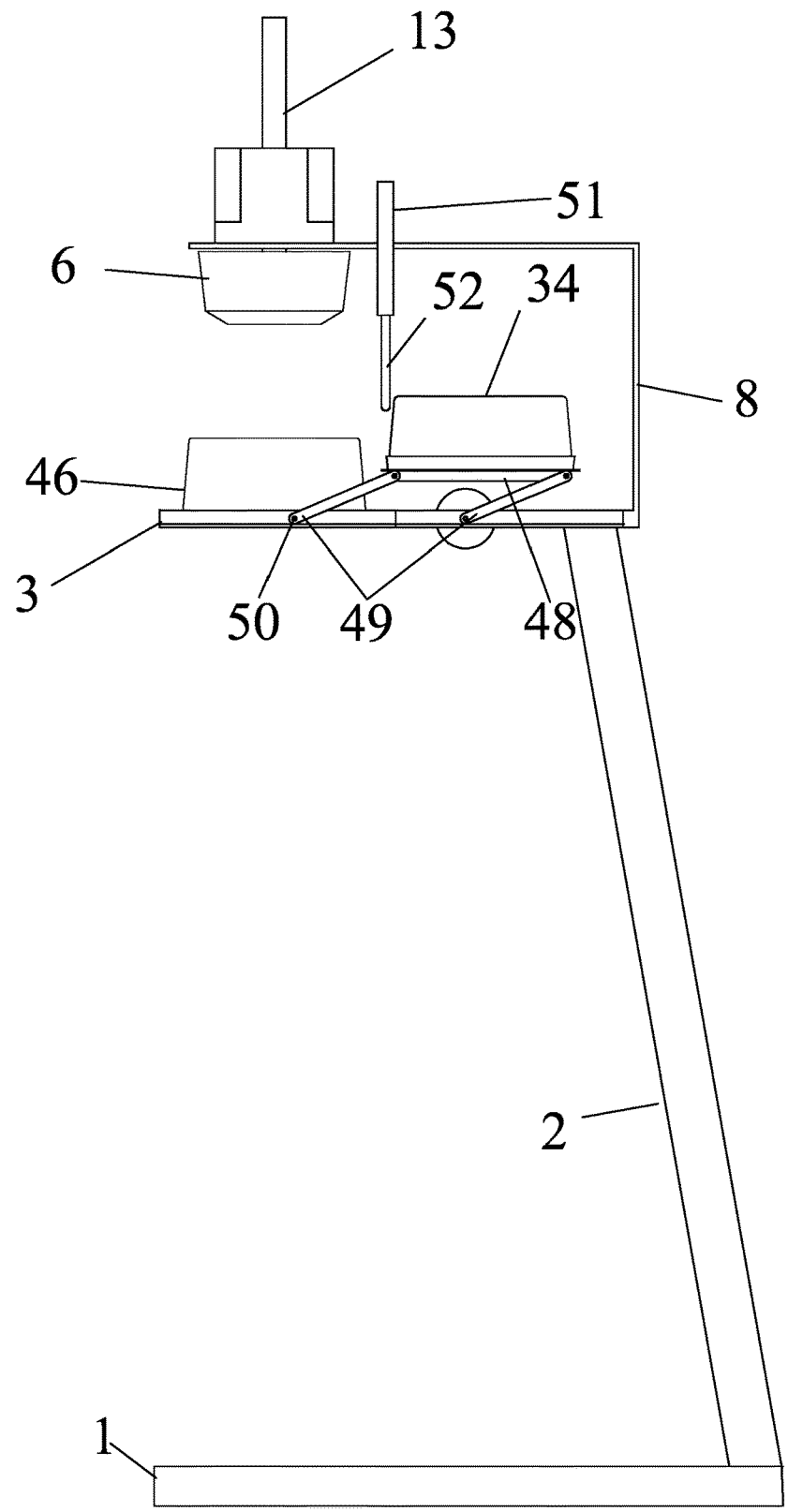
FIG. 6d is a side elevation of the dispensing apparatus of the FIG. 5b embodiment showing two step container in position before moving to disposal tunnel.
Figure 7B:
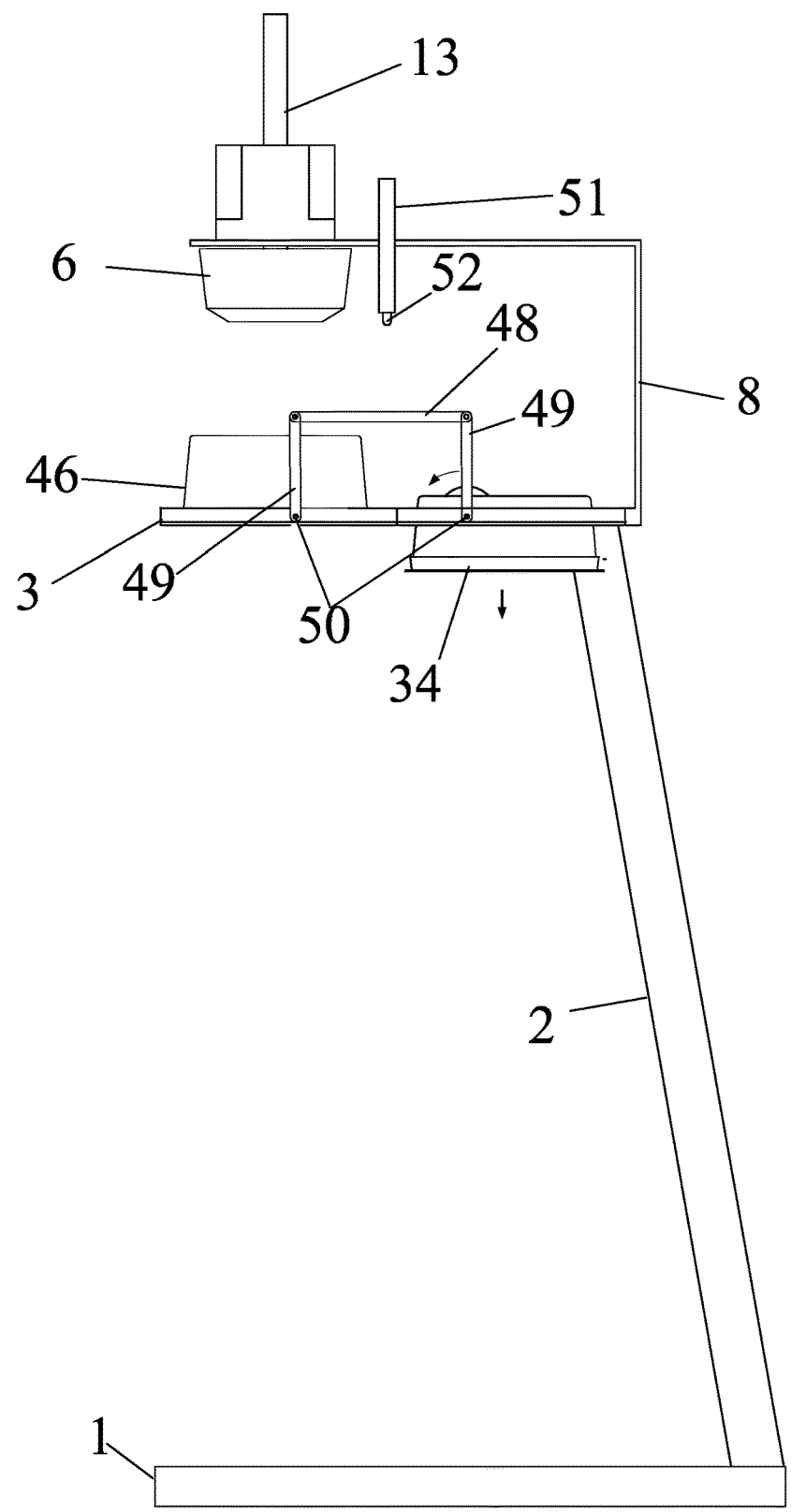
FIG. 7b is a side elevation of the dispensing apparatus of the FIG. 5b embodiment showing empty two step collapsible container fall through extraction tunnel.
Figure 7C:
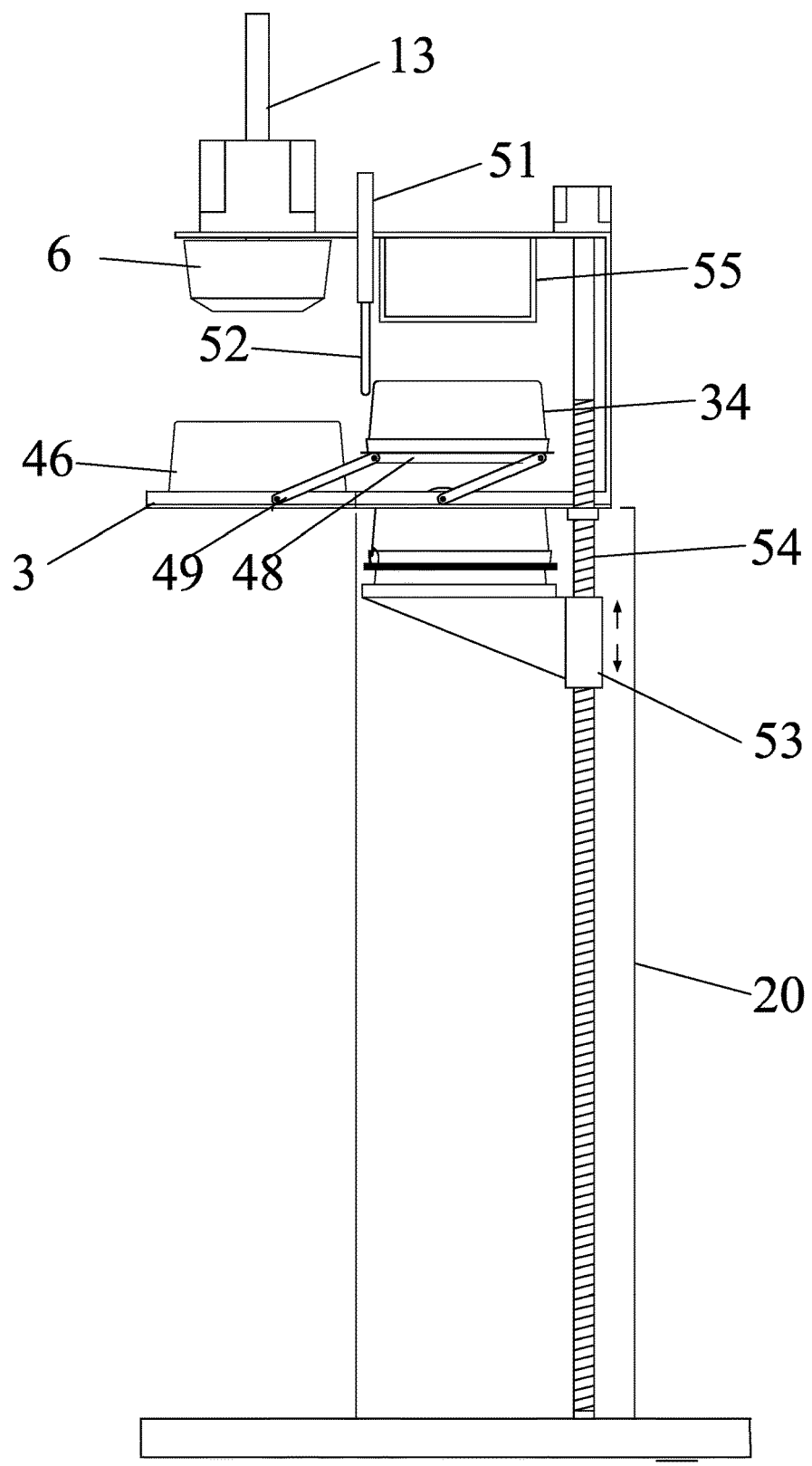
FIG. 7c is a side elevation of a dispensing apparatus showing additional options of storing two step container one inside another, according to yet another embodiment of the invention.

Referring to another embodiment as shown in FIGS. 5b, 6b-6d, 7b, and 7c, dispensing apparatus for dispensing frozen desserts from collapsible two step thin walled container with thin wall lid (FIGS. 10-11) with automatic removal of empty cup with the option to store empty cups within one another until trash removal. In certain embodiments, dispensing apparatus has electric drive motor with linear drive 13, however plunger 6 can be engaged by any kind of power, such as hydraulic or by hand. This dispensing apparatus is similar to the embodiment shown in FIG. 3b, except there is a different removal mechanism, option to store empty containers within one another, and special fixture 46 on bottom part of seating frame 3 for two step containers. This fixture 46 has lid-like solid shape support member for container 34. As shown in FIGS. 5b, 6b-6d, 7b, and 7c, dispensing apparatus is comprised of a rectangular shaped frame with short side open 8 in which upper part is where electric motor with control is located and bottom part is where collapsible two step container and lifting mechanism for removal of empty containers after extraction are located. Bottom part of the seating frame 3 has opening (not shown) for product extraction. The container seats on a special fixture shape support member 46. The removal mechanism comprises two stainless steel corners 48 (on which containers seat after they are placed on fixture 46 for extrusion of product) connected by hinges 49 on axes 50 that look like a parallelogram as shown in FIG. 6b. The rectangular shape frame with short side open 8 is supported by disposal tunnel supporting elements 2 and base 1, but it also can be equipped with mechanism for storing empty containers within one another therefore significantly reducing waste as shown in FIG. 7c.

In certain embodiments, this dispensing apparatus operates as follows:

1) The two step container 34 with prefilled product is placed onto special fixture 46 on frame seating 3, the fixture walls and upper end come together in tight connection with lid walls 39 and lid curve end 40.

2) The opening made at the plastic cover of dispenser for entering containers is closed with door 18 (see FIG. 9) that may be latched by a magnet, motorized or solenoid lock, or by any other switch (not shown).

3) The dispensing apparatus detects that there is container 34 in dispensing position, and opening is closed with the door 18 and latched (not shown). Then the dispense indicator 16 will light up green to indicate that the machine is ready for dispensing and dispensing button 16 may be pressed.

4) After the dispensing button 16 is pressed, the linear actuator 13 commences operation and the plunger 6 moves downwards and dispenses product from the container 34, pushing container to collapse at the end of the process.

5) Once the product has been dispensed, the linear actuator 13 retracts the plunger 6. When the plunger 6 has returned fully to its uppermost position (FIG. 5b), the second actuator 51 through connecting link 52 begins to lift up corners 48 with container 34 seating on it, on hinges 49 moving on axes 50, as shown in FIGS. 5b, 6b, and 6c. When removed container moves in position out of fixture 46 to disposal tunnel as shown in FIG. 6d, it is pushed from removal corners to disposal tunnel by link 52 as shown in FIG. 6d and falls to disposal tunnel (FIG. 7b). Removal corners 48 on hinges 49 through axes 50 return back into position and are ready for the removal of the next container as shown in FIG. 5b.

6) The dispensing apparatus detects that the process of dispensing and removal is finished and removal corner 48 is back into place, then the light indicator will light up to show that dispenser is ready for new cycle.

7) When it applies, the additional option of storing empty containers one inside the other, after extrusion of the product, container is moved into position as shown in FIG. 7c in disposal tunnel 20. Disposal tunnel 20 comprises seating part 53 with fixture shaped for housing of empty container, pillar 54 on which seating part 53 can move up and down and rotate aside and plunger 55 which has shape made to fit inside diameter of container. When removal mechanism moves back into place, after removal of empty container from fixture 46, the link 52 of actuator 51 pushes empty container 34 from removal corners 48 onto seating platform 53. Seating platform 53 rotates with empty container 34 aside and then moves up on pillar 54 towards plunger 55. When it reaches the uppermost position, plunger 55 moves inside empty container 34 and because of plunger 55 special shape, it comes into tight connection inside container 34. The container remains securely attached to plunger after seating platform 53 moves down and back into position to receive the next empty container. The next container will move in the same process being pushed by platform 53 and will go inside previous container seating on plunger 55. Special detector will detect when pile is too big and then the pile will be released from plunger 55 to trash container (not shown).

Figure 2:
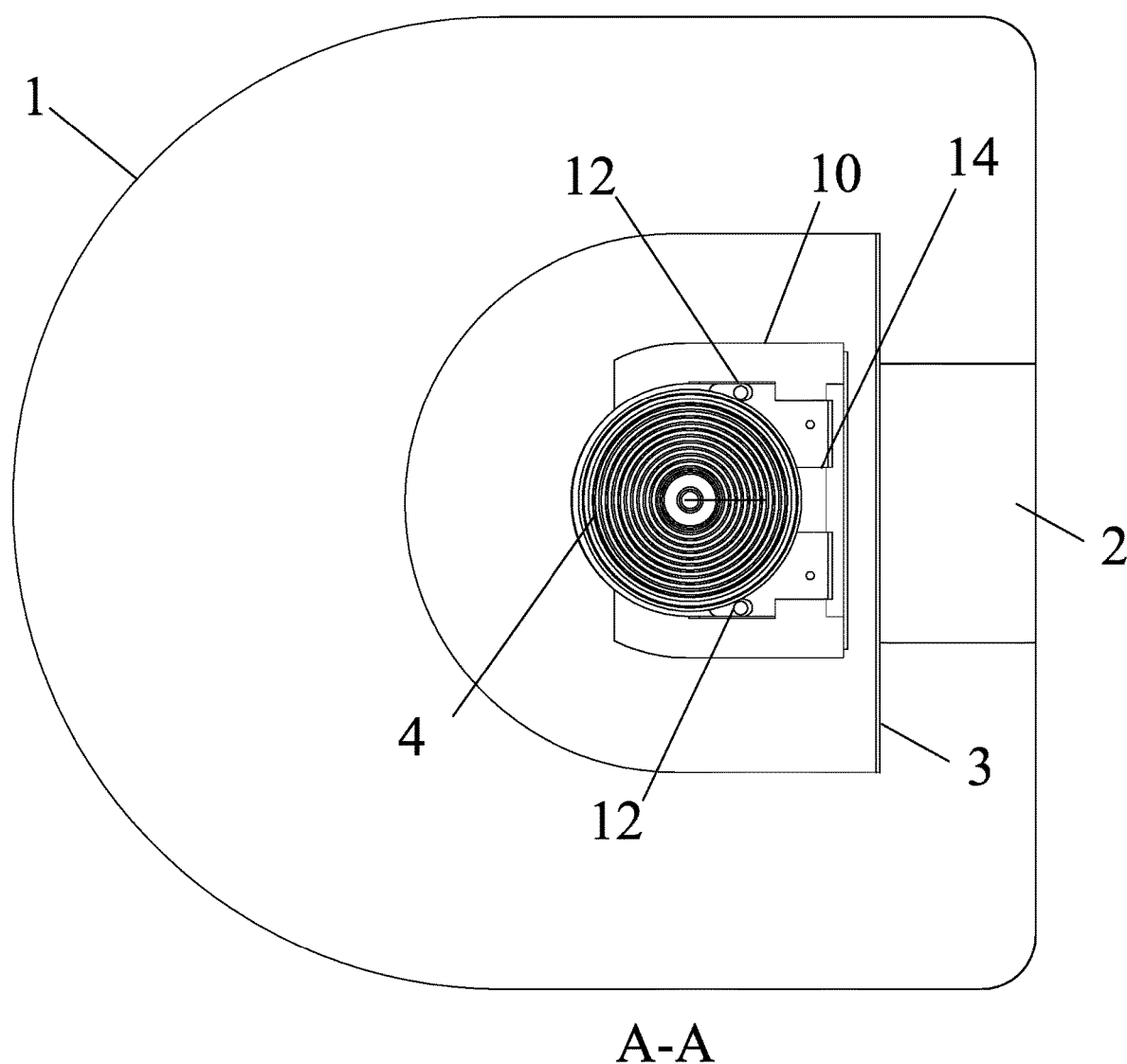
FIG. 2 is a view in the direction of arrows A-A in the FIG. 1a embodiment.
Figure 3A:
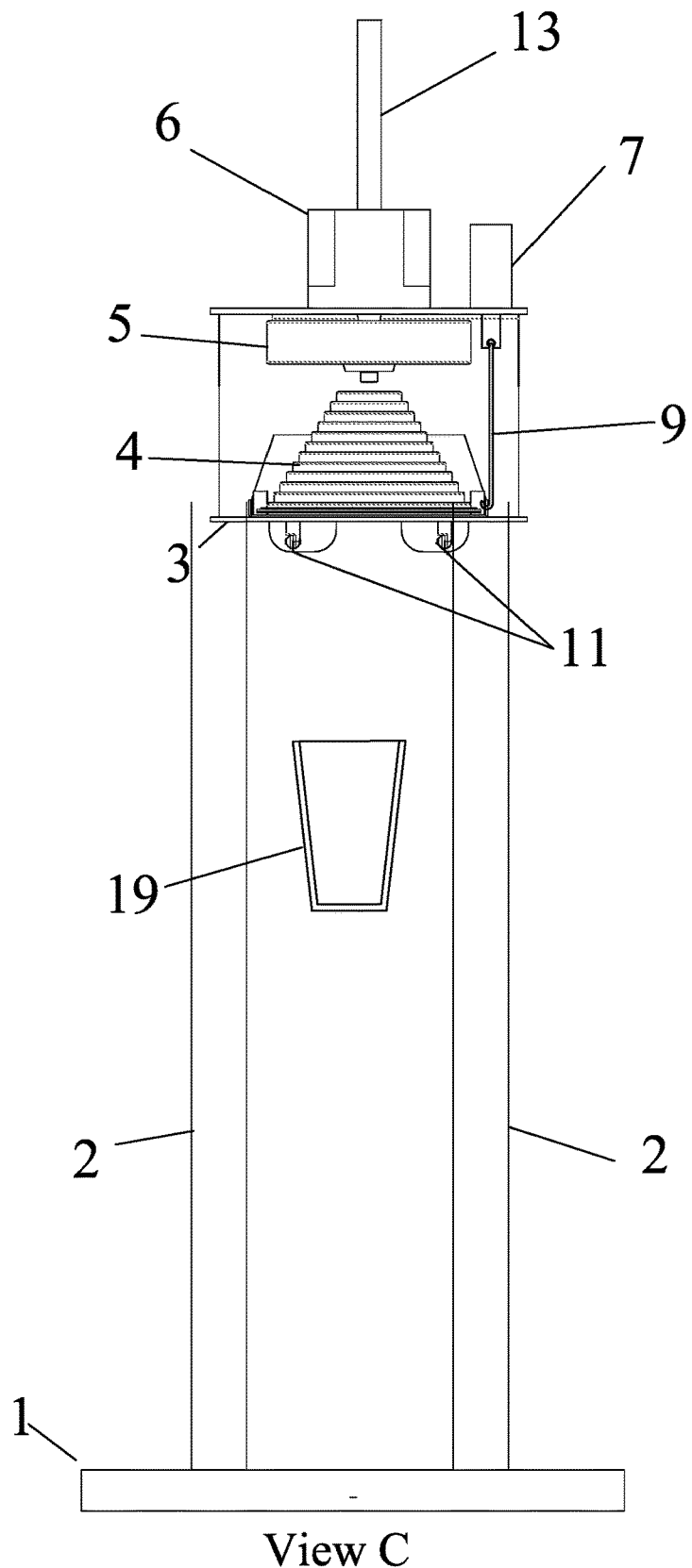
FIG. 3a is a view in the direction of arrow C in the FIG. 1a embodiment.
Figure 8A:
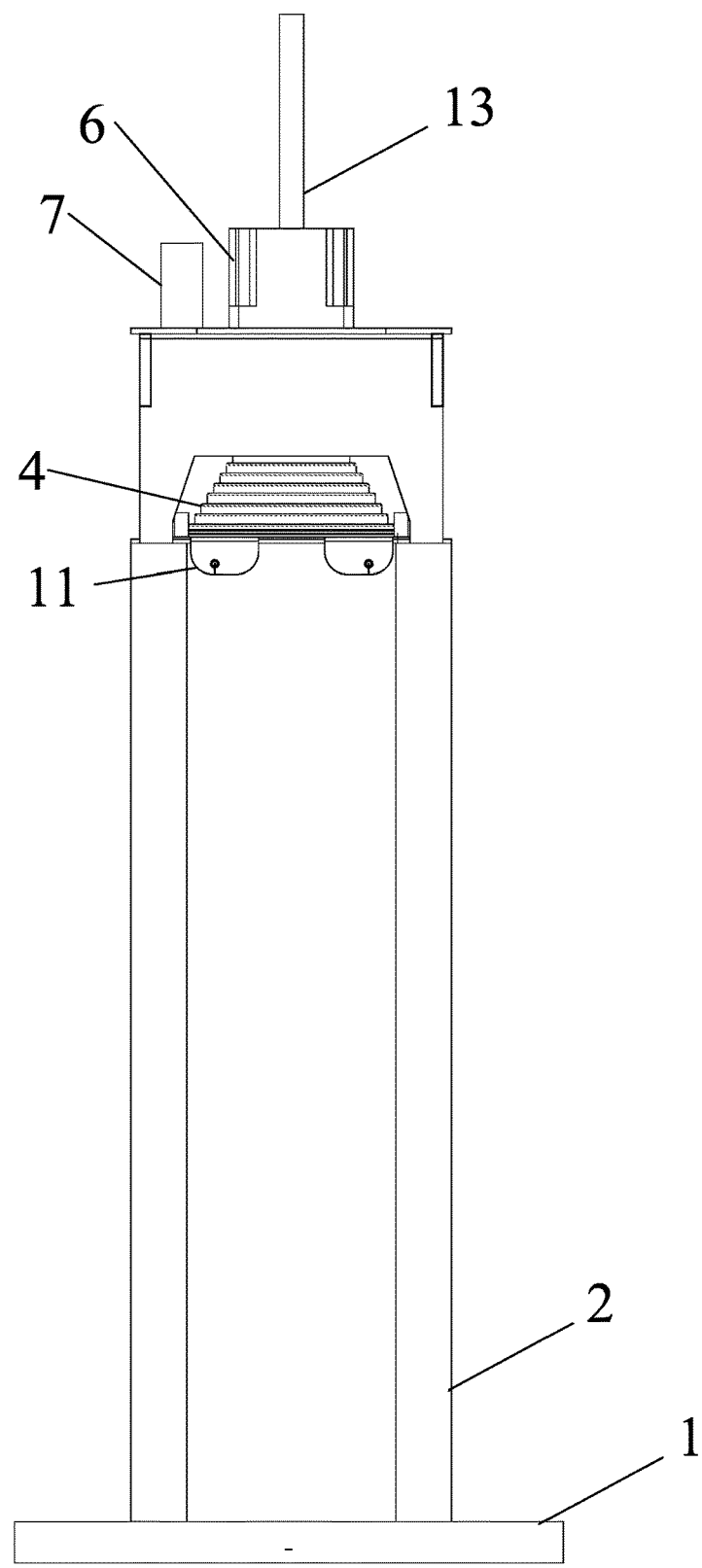
FIG. 8a is a view in direction of arrow B in the FIG. 1a embodiment.
Figure 8B:
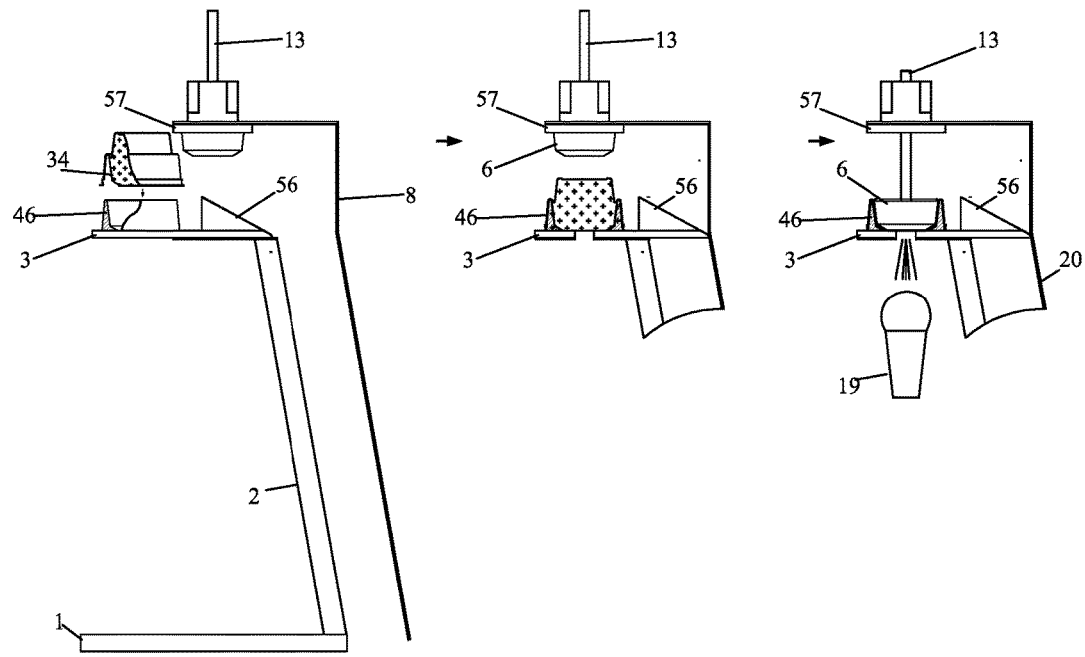
FIG. 8b shows a side elevation of a dispensing apparatus with automatic removal of empty container with fixed fixture for two step deformable container and removal inclined element 56, according to still another embodiment of the invention. The portions of FIG. 8b depict the following.
Figure 8B:
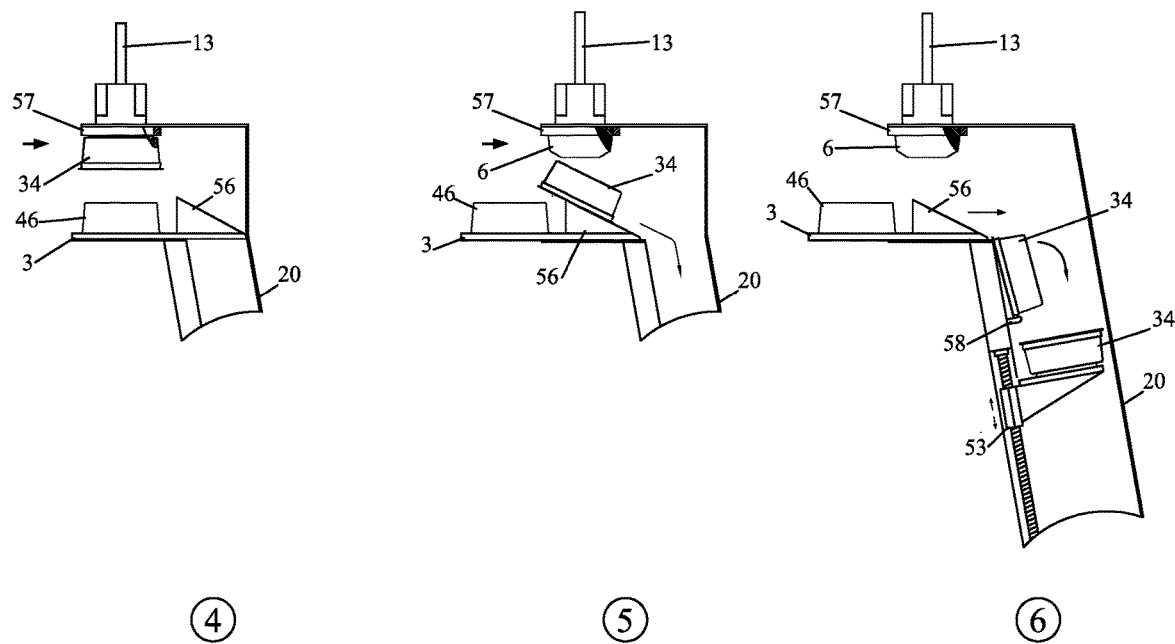

Referring to similar embodiment as shown in FIGS. 5b, 6b-6d, 7b, and 7c, a dispensing apparatus for dispensing frozen desserts from collapsible two step container (FIGS. 10-11) with another automatic removal options for empty cup is shown in FIG. 8b. In certain embodiments, dispensing apparatus has electric drive motor with linear drive 13, however plunger 6 can be engaged by any kind of power, such as hydraulic or by hand. This dispensing apparatus is similar to embodiment shown in FIGS. 5b, 6b-6d, 7b, and 7c, except there is a different removal mechanism for the empty container. After discharging the product by means of custom made plunger 6, which fits intimately to fixture 46, plunger 6 will keep empty container 34 sitting engaged on plunger 6 when it returns after discharge to upper position. There is also the option to store empty containers within one another. Removal mechanism includes inclined removal element 56 together with special fixture 46 that seats on the bottom part of frame 3 for two step container, stripping ring 57 in upper part frame 8 with diameter dimensions slightly bigger than diameter of plunger 6. As shown in FIG. 8*b*, dispensing apparatus is comprised of rectangular shaped frame with short side open 8 in which upper part is where electric motor with control is located and bottom part is where collapsible two step container and removal mechanism of empty containers after extraction are located. Bottom part of the seating frame 3 has opening for product extraction. The container seats on special fixture shape support member 46. The removal mechanism comprises plunger 6, stripping ring 57, and inclined element 56. For example, in one illustrative embodiment, the inclination angle of the inclined element 56 in FIG. 8*b* may be in the range between 45 degrees and 60 degrees, inclusive of all values in the range. As shown on FIG. 8*b*, the rectangular shape frame with short side open 8 is supported by disposal tunnel 20, but it also can be equipped with mechanism for storing empty containers within one another, therefore significantly reducing waste as shown in FIG. 7*c*. In certain embodiments, this dispensing apparatus operates as follows:

1) After opening of dispenser door in plastic cover, seating frame 3 with fixture 46 and inclined element 56 fixed on it moves forward where container with pre-filled product is placed on fixture 46 in such a way that fixture walls and upper end come together in tight connection with lid walls 39*a* and lid curve end 40 as shown in FIGS. 8*b*-1 and 11.
2) Seating frame 3 with container moves back inside dispenser and may be latched by magnet, motorized or solenoid lock, or by any other switch (not shown) as in FIG. 8*b*-2.
3) The dispensing apparatus detects that there is a container 34 in dispensing position, and opening is closed and latched (not shown). Then the dispenser indicator 16 will light up green to indicate that the machine is ready for dispensing and dispensing button 16 may be pressed as shown in FIG. 8*b*-2.
4) After the dispensing button 16 is pressed, the linear actuator 13 commences operation and the plunger 6 moves downwards and dispenses product from container 34 pushing container to collapse at the end of process as shown in FIG. 8*b*-3.
5) Once the product has been dispensed, the linear actuator 13 retracts the plunger 6 with empty cup 34 seating tight on plunger. Plunger 6 retracts to almost uppermost position and stops just under stripping ring 57 as shown in FIG. 8*b*-4.
6) After the plunger 6 stops at almost uppermost position, the seating frame 3 with special fixture 46 and inclined element 56 moves outside. Sensor (not shown) detects that seating frame 3 moved outside, retracts plunger 6 to uppermost position and removes empty cup 34 from plunger 6 by stripping ring 57. Empty cup 34 falls on inclined element 56, that has come underneath the plunger 6 and gravity is sufficient enough for container to slide down through disposal tunnel 20 as shown in FIG. 8*b*-5. Empty cup 34 is now leaning on edge 58 in the tunnel 20. The ledge 58 located in tunnel 20 is in such dimension and position, that when one edge of cup seat on edge 58 another edge of cup 34 stay above level of seating frame 3.
7) When seating frame 3 with new pre-filled cup 34 is placed on fixture 46, and moves back inside dispenser, the inclined element 56 pushes the ledge of the empty cup 34. That flips the cup inside the tunnel to a position with the orifice placed up and allows the empty cups to pile in such a way that gives additional protection from leaking remnants (if there is any) before pile with empty cups is removed to the waste dispenser prior to new cycle as shown in FIG. 8*b*-6.
8) When it applies, the additional option of storing empty containers one inside the other, after extrusion of the product, container is moved into position as shown in FIG. 7*c* in disposal tunnel 20. Disposal tunnel 20 comprises seating part 53 with fixture shaped for housing of empty container, pillar 54 on which seating part 53 can move up and down and rotate aside, and plunger 55 which has shape made to fit inside diameter of container. When removal mechanism moves back into place, after removal of empty container from fixture 46, by plunger 6 and stripping ring 57, inclined element 56 pushes empty container 34 into tunnel 20. When seating frame 3 with new pre-filled cup 34 is placed on fixture 46, and moves back inside dispenser, the inclined element 56 pushes the ledge of the empty cup 34. That flips the cup inside the tunnel to a position with the orifice placed up and places it on seating platform 53. Seating platform 53 rotates with empty container 34 aside and then moves up on pillar 54 towards plunger 55. When it reaches the uppermost position, plunger 55 moves inside empty container 34 and because of plunger 55 special shape, it comes into tight connection inside container 34. The container remains securely attached to plunger after seating platform 53 moves down and back into position to receive the next empty container. The next container will move in the same process being pushed by platform 53 and will go inside previous container seating on plunger 55. Special detector will detect when pile is too big and then the pile will be released from plunger 55 to trash container (not shown).

Referring to the embodiment of FIGS. 1B, 1*c*, 3*b*, and 4*b*, the dispensing apparatus without automatic removal for dispensing frozen dessert, from collapsible container 34 in FIG. 10 will be described. Such container comprises deformable, collapsible two step thin wall container and lid (FIGS. 10-11) with an orifice for dispensing product. The product discharged from container is received in cone 19 or other customer dish, beneath the outlet opening of container 34.

Figure 3B:
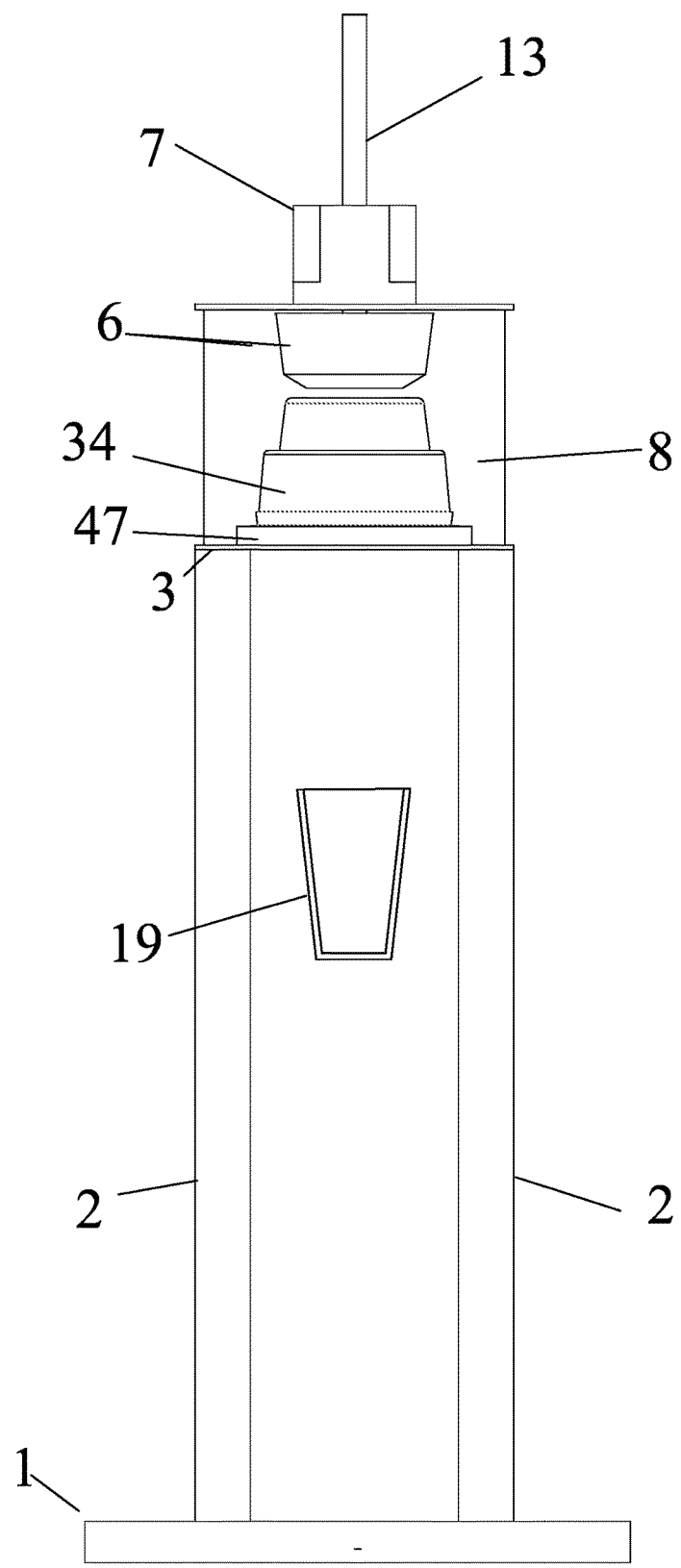
FIG. 3b is a view in the direction of arrow A in the embodiment of FIGS. 1B and 1c.

In certain embodiments, the dispensing apparatus has an electric drive motor with linear drive 13, however plunger 6 can be engaged by any kind of power, such as hydraulic or by hand. The dispensing apparatus is similar to embodiment as shown in FIG. 3*b* except that the bottom part of seating frame 3 has a special fixture 46 that has a lid like shape solid support member for container 34. The seating frame 3 with special fixture 46 is movable (see FIG. 1B). Inside frame of dispenser there is a special ledge 47 for additional retention to keep container from sliding from lid at extraction process, to prevent any possible leak of product.

In certain embodiments, this dispensing apparatus operates as follows:

1) After opening of dispenser door in plastic cover, seating frame 3 with fixture 46 fixed on it, moves forward where container with prefilled product is placed on fixture, in such a way that fixture walls and upper end coming together in tight connection with lid walls 39a and lid curve end 40.

2) Seating frame 3 with container moves back inside dispenser. Special edge 47 (see FIG. 12c) which is inside frame holds cup 34 to prevent it from moving and sliding when the plunger begins to push on cup 34 for extraction of the product.

3) The dispensing apparatus detects that there is container 34 in dispensing position, and opening is closed with door 18 and latched (not shown). Then, the dispense indicator 16 will light up green to indicate that the machine is ready for dispensing and dispensing button 16 may be pressed (see FIG. 9).

Figure 4B:
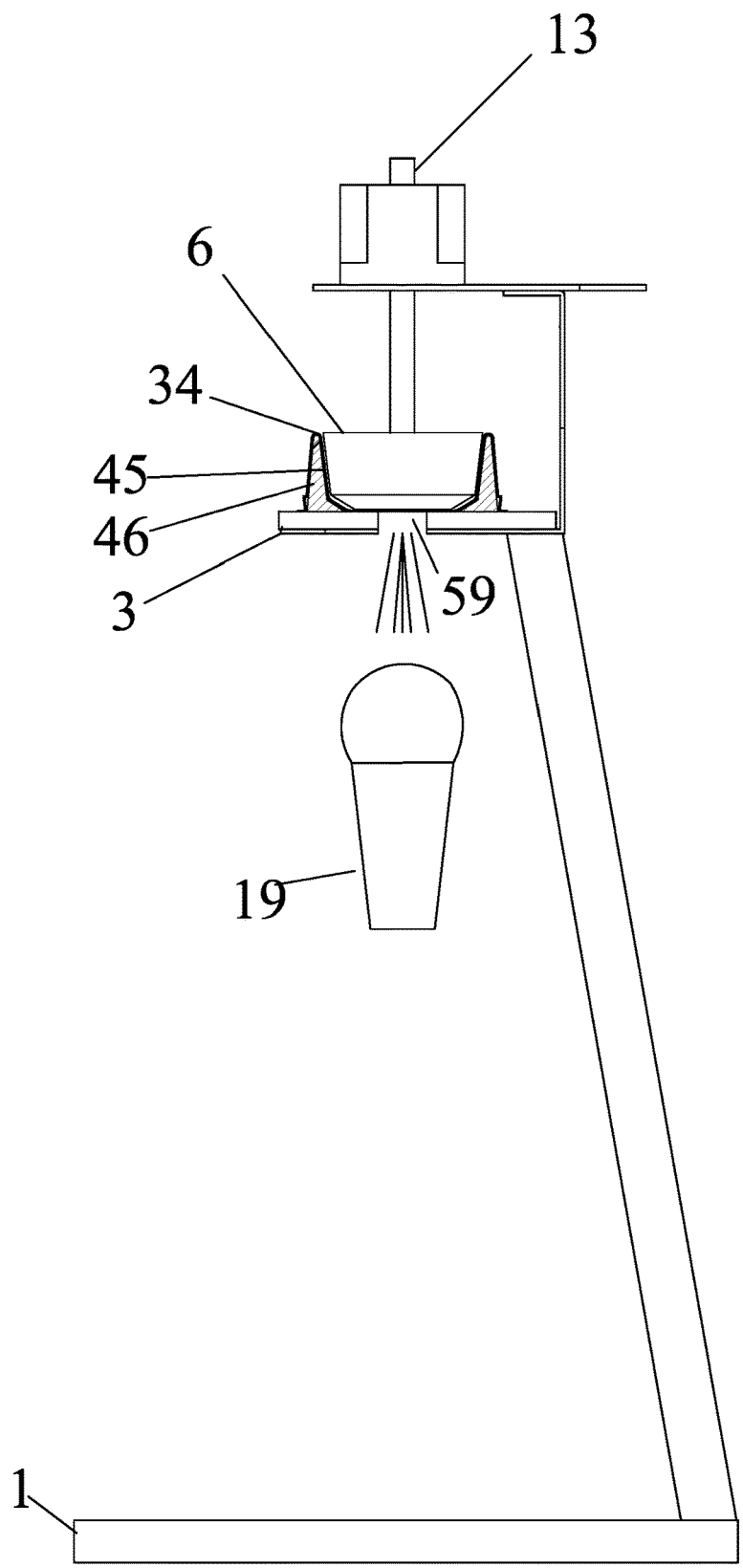
FIG. 4b is a side elevation showing the dispensing apparatus of the FIG. 1c embodiment at the end of dispensing operation with plunger fully collapsing deformable two step container without automatic removal.

4) After the dispensing button 16 is pressed, the linear actuator 13 commences operation and the plunger 6 moves downwards and dispenses product from container 34 as shown in FIG. 4b.

5) Once the product has been dispensed, the linear actuator 13 retracts the plunger 6. When the plunger 6 has returned fully to its uppermost position, the door 18 will be open and seating frame 3 with empty container will be moved outside of dispenser, where empty container is removed and dispenser is ready for new cycle.

Now, with reference to FIGS. 10-13, an embodiment of the two step container comprising a container 34 and lid 45, 45a is illustrated. As shown in FIG. 10, the thin-walled container includes an annular section 31 with a smaller diameter, and annular section 32 with a bigger diameter, and curve section 33. For example, in one illustrative embodiment, the annular section 31 may have a diameter of approximately 68 millimeters, and the annular section 32 may have a diameter of approximately 85 millimeters. Annular section 31 from first end wall 42 connected to annular section 32 by curved section 33 to second end wall 36. In certain embodiments, each annular wall section 31, 32 has a minimal change in diameter, while curved element 33 has a changing diameter as it curves from annular section 31 to annular section 32. First end wall 42 has a special recess 30 suited for a plunger shape, that also provides the bottom part of cup with better form and flexibility for collapsing. Special edge 35 provides stacking ability for empty cups (as ledge 37 provides for lids) as viscous product is dispersed into container 34 in a production line during prefilling of container phase. Special ledge 35 also allows for lid to lock with cup when lid ledge element 37, moves inside cup ledge element 35, by inserting lid 45 into cup 34 after container is filled with product. The thickness of annular elements 31, 32 can be approximately the same (e.g., within 0.01 millimeters of one another), when the lid is inserted into the cup for it to collapse and extrude product, or thickness of smaller ring wall 31 could be less than thickness of bigger ring wall 32 when the cup collapses without lid attached to it. For example, in one illustrative embodiment, the annular section 31 may have a wall thickness of approximately 0.26 millimeters, the annular section 32 may have a wall thickness of approximately 0.31 millimeters, and the curved section 33 may have a wall thickness of approximately 0.14 millimeters. Both annular elements 31, 32 are always thicker than curved element 33 connecting these annular elements.

FIG. 13 shows cross sectional view of deformable container 34 from its prefilled position (1) to collapsed position (5) after plunger has been fully pressed for the extraction of the product. Cup 34 is prefilled with viscous product on production line, and then lid 45 is inserted in cup 34. Lid wall element 39 fits precisely inside cup wall 32 in a tight connection. The curved lid element ending 40 of lid wall 39, 39a moves inside cup curve element 33 in tight connection (FIG. 12a). The lid ledge element 37 locks into cup ledge element 35, providing additional locking mechanism as in FIG. 12.

When a cup is put into the dispenser for extraction of product, upon receiving pressure from plunger 6, pushes on cup wall 42 that has special recess 30 for plunger 6 in downward direction towards lid wall 38 with orifice 44 (see FIG. 12a) for extraction of product. Annular section 31 of cup 34 pushes curved element 33 sitting on curve ending 40 of lid wall 39, 39a downwards, thereby bending and flexing curved element 33. With increasing pressure from plunger 6, curved section 33 is bent further, extending inside lid wall 39a and then under continuing pressure, annular cup wall 31 of smaller diameter begins to invert itself moving downwards inside lid wall 39a that stays in tight connection and provides strong support to wall 31 until straight element of container wall 31 finally fully inverts itself at the end of extraction process. First end wall of container 42 arrives in tight connection with lid end wall 38, which has same recess 30 in cup wall 42, as shown in FIGS. 13-1 through 13-5. The same process of deforming and collapsing cup can be made without lid. In this case, the straight element of the bigger ring 32 of cup 34 must be thicker than the straight element of smaller ring 31 to allow inversion of annular wall section 31 into annular wall section 32.

When the wall 39 of lid is not in direct contact with wall lid 39a (especially when made by thermoforming) as shown in FIG. 11, special fixture 46 located on dispenser seating plate (FIG. 1B) with a shape that fits intimately between wall 39 and wall 39a can be used to make extraction process much better and easier, by having lid walls 39, 39a seat on fixture 46 providing strong support for bigger ring wall 32 seating on lid wall 39 and preventing any possible, even small, deformation to cup wall 32 or lid wall 39 under pusher pressure for extraction. Fixture 46 also provides tight connection between inverted wall of small ring 31 and lid wall 39a preventing leaving any wrinkles between inverted container wall 31 and lid wall 39a and accordingly there are almost no remnants left (FIG. 4b). However, wall 39 of lid 45 can be made as solid and thick, as shown in FIG. 12a. In this case, there is no need for special fixture 46 on dispenser for the extraction process, as thick wall 43 of lid 45 provides the same exact support as fixture and for this kind of cup and lid, as in dispenser shown in FIGS. 1B and 8b, with or without automatic removal can be used. When container is prefilled with semi-solid or viscous product, the product itself at the time of extraction helped ensure that inverted small ring 31 would not form any wrinkles, creases, or dents on walls that can keep some remnants of product in the container. However, designing the right shape and dimension plunger suited to fit the cup-lid dimensions is the most important part for properly collapsing container without leaving any wrinkles or creases and leaving almost no remnants of product. Container and lid are also fully recyclable and promote at least twice less waste than comparable products currently on the market.

The amount of product within container 34 can be selected according to predetermined requirements, such as the size of a predetermined portion of product to be received by receptacle 19. Also, several portions may be discharged from the same container, simply by halting the movement of the discharge plunger 6 in an intermediate position when sufficient product has been discharged. Thus, container 34 may be of any suitable size.

The deformable container and lid, according to embodiments of the present invention, may be manufactured from any material, but are preferably manufactured from a plastic material such as, without limitation, polypropylene, polystyrene, polyvinyl chloride, ethylene, polyvinyl acetate or polyethylene. In other embodiments, the container and lid may be made from paper or cardboard coated with a plastic material. Other materials are also contemplated.

In certain embodiments, the deformable container and lid are manufactured using methods known in the art such as, without limitation, injection molding, thermoforming, or blow-molding. The thermoforming process is preferred, due to the small thicknesses of the container, weight-saving capabilities, and reduced power consumption that may be achieved by the thermoforming process. Additionally, as known in the art, scrap and plastic waste from the thermoforming process may be recycled back into the thermoforming process, thereby helping to reduce waste.

In certain embodiments, dispensers can also be made with small cart 22 as in FIG. 9 that make it ready for usage at any commercial point. The cart provides a fixed place for trash, paper towel holder 21 for cleaning, and open counter space. The cart can also include a small refrigerator for prefilled containers.

In certain embodiments, all cover plastic parts that cover the dispenser are made in such a way that can be easily removed for cleaning. In certain embodiments, the seating part of the frame, removal plate, and removal tunnel all have slots for the purpose that any leaks from the container, for any reason in process of discharging or removal (hot weather or soft product in container), will always fall down through slots on the base cleaning plate and not inside the dispenser or removal tunnel. This is made for hygienic and contamination prevention purposes as well as to prevent bad smell of deteriorated product if it cannot be cleaned immediately, especially in hot weather conditions. Container at any position has its orifice always positioned over slots.

It is readily apparent that the aforedescribed collapsible, deformable container and dispensing apparatus offers numerous advantages and benefits. For example, in certain embodiments, a deformable container is provided that is environmentally friendly, and thin-walled so that it collapses into a substantially flattened shape after the dispensing of viscous or semi-solid food product contained within, thus leaving nearly no remnants inside the container.

In certain embodiments, as described above, the deformable container is a single-use, disposable container for dispensing viscous or semi-solid product such as, for example, ice cream, although other viscous or semi-solid products are contemplated. The deformable container has a generally cylindrical or conical (e.g., frustoconical) shape comprising a first end wall, and at least one collapsible side wall connecting the first end wall and the opening or connecting the first and second end walls. The first end wall may include a recess configured to engage with a plunger of an associated dispensing machine. The second end wall may include an opening (e.g., an outlet opening) configured to allow the viscous or semi-solid product stored within the container to be dispensed therethrough upon deformation of the container by collapsing of the at least one collapsible side wall.

One advantage of the aforedescribed container is having an orifice for extraction of product at the upper part of the container (at the cover lid) and not at the bottom of the container (as some conventional containers). This will prevent leaking and contamination issues from pre-filled container with product in case that container will lack refrigeration for a period of time when it is at storage facility or during transportation and cause the product to melt.

Another advantage of the aforedescribed container is having thin walled lid with crisscross orifice 45a as shown in FIG. 12b that can enlarge the opening for extrusion of pre-filled product as when it becomes less viscous than soft ice cream and also can be used for extraction of standard ice cream (not soft ice cream). This cannot be done with conventional rigid containers due to no possibility of change of orifice opening dimensions at extraction process. Advantageously, the thin walled lid 45a in FIG. 12b is flexible enough so as to allow the portions of the lid end wall that define the crisscross orifice to deform depending on a viscosity and/or hardness of the dispensable product being extruded from the deformable container.

In general, in certain embodiments, the deformable container may be pre-filled with the viscous or semi-solid product and sealed against contamination. In operation, a user may unseal the container and dispense the product therefrom. The deformable container described herein may be used for many different food applications that include, but are not limited to, frozen yogurt, gelato, soft ice cream, semi-hard ice cream, capsules for coffee, one time usage bowls for salad sells for lunch, and other food items. Depending on the application, the deformable container may be formed using a wide variety of different dimensional parameters. For example, when the containers are used for frozen yogurt or soft ice cream, containers with wall thicknesses (e.g., between 0.1 and 0.3 millimeters) and diameters suited for a particular production line may be used. The particular dimensional parameters used may depend on the manufacturer line installed in a creamery that will fill the prefilled cups. When the deformable containers are used as capsules for a coffee machine, the containers would be different diameters and wall thicknesses, depend on the coffee dispenser dimensions and process with hot water.

In addition, the simple operated relatively small sized dispensing apparatus described in the embodiments herein is especially suitable for dispensing food products from collapsible container, which is also adaptable and hygienic. This dispenser is easy to operate by any person (customer) without any special training at home or any sales point. Advantageously, due to their relatively small size, the dispensing apparatuses described herein are readily adaptable for household use. In certain embodiments, the dispenser provides for automatic removal of the collapsible container after discharge of product. In certain embodiments, an emphasis is made on the dispenser being hygienic, as the dispenser is built in such form that at any time of operation and removal, any leaking remnants of product cannot fall inside dispenser and always will fall through a special slot at removal plate and removal tunnel on an open area, making it easy to clean. Also, in these embodiments, for better hygienic purposes, all plastic cover parts are easily removable for cleaning purposes.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A deformable container, comprising:
an end wall section;
a first annular wall section connected to the end wall section;
a curved wall section connected to the first annular wall section;
a second annular wall section connected to the first annular wall section via the curved wall section, the second annular wall section circumscribing a central void, the first annular wall section and the second annular wall section each comprising straight wall portions, the first annular wall section having a first diameter and the second annular wall section having a second diameter, the second diameter of the second annular wall section being greater than the first diameter of the first annular wall section such that the deformable container has a stepped configuration, the first annular wall section having a first wall thickness, the second annular wall section having a second wall thickness, and the curved wall section having a third wall thickness; and
a lid, the lid including a lid straight wall portion that corresponds to the straight wall portion of the second annular wall section, and the lid straight wall portion configured to be disposed adjacent to the straight wall portion of the second annular wall section when the lid is inserted into an open end of the second annular wall section;
wherein, upon extrusion of a dispensable product from the deformable container by a force exerted upon the end wall section, the curved wall section is configured to deform into the central void circumscribed by the second annular wall section, and the first annular wall section is configured to deform into and invert within the central void circumscribed by the second annular wall section, and the lid straight wall portion supports the straight wall portion of the second annular wall section when the force is being exerted upon the end wall section of the first annular wall section so as to prevent a buckling of the straight wall portion of the second annular wall section;
wherein the first wall thickness of the first annular wall section is approximately equal to the second wall thickness of the second annular wall section, and the third wall thickness of the curved wall section is less than the first and second wall thicknesses.

2. The deformable container according to claim 1, wherein the lid further comprises a first ledge portion and the second annular wall section comprises a second ledge portion, the first ledge portion of the lid configured to engage with the second ledge portion of the second annular wall section when the lid is inserted into the open end of the second annular wall section so that the lid locks into place with the second annular wall section.

3. The deformable container according to claim 1, wherein the lid further includes a lid end wall section defining an orifice for dispensing of the dispensable product from the deformable container.

4. The deformable container according to claim 3, wherein the orifice in the lid end wall section has a crisscross shape that allows for variable orifice sizes depending on a viscosity and/or hardness of the dispensable product being extruded from the deformable container.

5. A deformable container, comprising:
an end wall section;
a first annular wall section connected to the end wall section;
a curved wall section connected to the first annular wall section;
a second annular wall section connected to the first annular wall section via the curved wall section, the second annular wall section circumscribing a central void; and
a lid, the lid including a lid upright wall section that corresponds to the second annular wall section, and the lid upright wall section configured to be disposed adjacent to the second annular wall section when the lid is inserted into an open end of the second annular wall section;
wherein, upon extrusion of a dispensable product from the deformable container by a force exerted upon the end wall section, the curved wall section is configured to deform into the central void circumscribed by the second annular wall section, the first annular wall section is configured to deform into and invert within the central void circumscribed by the second annular wall section, and the first annular wall section is configured to be disposed adjacent to the lid upright wall section upon being inverted within the central void.

6. The deformable container according to claim 5, wherein the first annular wall section and the second annular wall section each comprise straight wall portions, the first annular wall section having a first diameter and the second annular wall section having a second diameter, the second diameter of the second annular wall section being greater than the first diameter of the first annular wall section such that the deformable container has a stepped configuration.

7. The deformable container according to claim 5, wherein the first annular wall section has a first wall thickness, the second annular wall section has a second wall thickness, and the curved wall section has a third wall thickness;
wherein the first wall thickness of the first annular wall section is less than the second wall thickness of the second annular wall section, and the third wall thickness of the curved wall section is less than the first wall thickness of the first annular wall section.

8. The deformable container according to claim 5, wherein the first annular wall section has a first wall thickness, the second annular wall section has a second wall thickness, and the curved wall section has a third wall thickness;
wherein the first wall thickness of the first annular wall section is approximately equal to the second wall thickness of the second annular wall section, and the third wall thickness of the curved wall section is less than the first and second wall thicknesses.

9. The deformable container according to claim 5, wherein the lid further includes a lid end wall section defining an orifice for dispensing of the dispensable product from the deformable container.

* * * * *